United States Patent
Li et al.

(10) Patent No.: US 12,400,608 B2
(45) Date of Patent: Aug. 26, 2025

(54) METHOD FOR ADJUSTING DISPLAY SCREEN BRIGHTNESS, ELECTRONIC DEVICE, AND STORAGE MEDIUM

(71) Applicant: Honor Device Co., Ltd., Shenzhen (CN)

(72) Inventors: Zhe Li, Shenzhen (CN); Yusen Wang, Shenzhen (CN); Xiao Luo, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/288,874

(22) PCT Filed: Dec. 26, 2022

(86) PCT No.: PCT/CN2022/142061
§ 371 (c)(1),
(2) Date: Oct. 30, 2023

(87) PCT Pub. No.: WO2023/160207
PCT Pub. Date: Aug. 31, 2023

(65) Prior Publication Data
US 2024/0212635 A1 Jun. 27, 2024

(30) Foreign Application Priority Data
Feb. 28, 2022 (CN) .......................... 202210191716.9

(51) Int. Cl.
*G09G 3/34* (2006.01)

(52) U.S. Cl.
CPC ... *G09G 3/3406* (2013.01); *G09G 2320/0606* (2013.01); *G09G 2320/0613* (2013.01);
(Continued)

(58) Field of Classification Search
CPC ... G09G 2320/0606; G09G 2320/0613; G09G 2320/0626; G09G 2320/08;
(Continued)

(56) References Cited

U.S. PATENT DOCUMENTS

| 2012/0242633 A1* | 9/2012 | Kim | G09G 3/20 345/207 |
| 2012/0274809 A1* | 11/2012 | Yang | H04N 5/58 348/E9.053 |

(Continued)

FOREIGN PATENT DOCUMENTS

| CN | 105049625 A | 11/2015 |
| CN | 106302977 A | 1/2017 |

(Continued)

*Primary Examiner* — Kenneth Bukowski
(74) *Attorney, Agent, or Firm* — Leydig, Voit & Mayer, Ltd.

(57) ABSTRACT

This application provides a method for adjusting display screen brightness, an electronic device, and a storage medium. The method includes: setting display screen brightness in response to an automatic brightness setting instruction; adjusting the display screen brightness in response to a brightness setting instruction generated by manually adjusting brightness by a user; determining, when a display screen is on again after the display screen is off, whether a mechanism of clearing the display screen brightness manually adjusted is triggered; if the mechanism of clearing the display screen brightness manually adjusted is triggered, setting the display screen brightness again in response to the automatic brightness setting instruction; determining, in response to an operation of manually adjusting the display screen brightness again, whether the operation of manually adjusting the display screen brightness again is the same as a previous operation of manually adjusting the display screen brightness.

20 Claims, 19 Drawing Sheets

| Ambient light | Default brightness | Brightness after preference is added | Change value |
|---|---|---|---|
| 0 | 4.5 | 4.5 | 0 |
| 5 | 18 | 18 | 0 |
| 20 | 58 | 58 | 0 |
| 50 | 87.5 | 107.98 | 20.48 |
| 100 | 95 | 120.6 | 25.6 |
| 200 | 107.5 | 139.5 | 32 |
| 400 | 130 | 170 | 40 |
| 1000 | 200 | 250 | 50 |

(52) U.S. Cl.
CPC . *G09G 2320/0626* (2013.01); *G09G 2320/08* (2013.01); *G09G 2354/00* (2013.01); *G09G 2360/144* (2013.01)

(58) Field of Classification Search
CPC ....... G09G 2330/021; G09G 2330/026; G09G 2354/00; G09G 2360/144; G09G 3/20; G09G 3/3406; G09G 5/10
See application file for complete search history.

(56) References Cited

U.S. PATENT DOCUMENTS

| | | | | |
|---|---|---|---|---|
| 2013/0162611 | A1* | 6/2013 | Lim | G09G 5/10 345/207 |
| 2023/0143803 | A1* | 5/2023 | Lee | G09G 3/2011 345/690 |
| 2023/0326427 | A1* | 10/2023 | Singh | A61B 3/112 345/589 |
| 2024/0153465 | A1* | 5/2024 | Zhang | G09G 3/3406 |
| 2024/0212635 | A1* | 6/2024 | Li | G09G 3/20 |
| 2024/0282257 | A1* | 8/2024 | Kim | G09G 5/10 |

FOREIGN PATENT DOCUMENTS

| | | |
|---|---|---|
| CN | 107665694 A | 2/2018 |
| CN | 105261346 B | 7/2018 |
| CN | 108401078 A | 8/2018 |
| CN | 108540638 A | 9/2018 |
| CN | 108550353 A | 9/2018 |
| CN | 109272970 A | 1/2019 |
| CN | 112201209 A | 1/2021 |
| CN | 112992100 A | 6/2021 |
| CN | 113192464 A | 7/2021 |
| CN | 113421532 A | 9/2021 |
| EP | 4087224 A1 | 11/2022 |
| JP | 2000137474 A | 5/2000 |
| JP | 201020072 A | 1/2010 |
| WO | 2021169402 A1 | 9/2021 |

* cited by examiner

| Ambient light | Default brightness | Brightness after preference is added | Change value |
|---|---|---|---|
| 0 | 4.5 | 4.5 | 0 |
| 5 | 18 | 18 | 0 |
| 20 | 58 | 58 | 0 |
| 50 | 87.5 | 107.98 | 20.48 |
| 100 | 95 | 120.6 | 25.6 |
| 200 | 107.5 | 139.5 | 32 |
| 400 | 130 | 170 | 40 |
| 1000 | 200 | 250 | 50 |

FIG. 1A

| Interval information | Ambient light brightness range | Brightness value |
|---|---|---|
| First interval | [0, 200 lux) | 25 |
| Second interval | [200 lUX, 400 lux) | 55 |
| Third interval | [400 lux, 1000 lux) | 70 |
| Fourth interval | [1000 lux, 3000 lux) | 120 |
| Fifth interval | [3000 Lux, ∞) | 250 |

METHOD FOR ADJUSTING DISPLAY SCREEN BRIGHTNESS, ELECTRONIC DEVICE, AND STORAGE MEDIUM

CROSS-REFERENCE TO RELATED APPLICATIONS

This application is a national stage of International Application No. PCT/CN2022/142061, filed on Dec. 26, 2022, which claims priority to Chinese Patent Application No. 202210191716.9, filed on Feb. 28, 2022. The disclosures of both of the aforementioned applications are hereby incorporated by reference in their entireties.

TECHNICAL FIELD

This application relates to the field of display technologies, and in particular, to a method for adjusting display screen brightness, an electronic device, and a storage medium

BACKGROUND

To improve user experience, display screen brightness of intelligent electronic devices such as a smartphone, a tablet computer, and a smartwatch may be adaptively adjusted according to ambient light brightness. In addition, to adapt to a personal requirement, a user may manually adjust the display screen brightness based on the display screen brightness automatically set by the electronic device, and after a screen of the electronic device is off and then is on, the display screen generally keeps the brightness manually adjusted by the user. However, the user may adjust the display screen brightness due to a misoperation. If the brightness manually adjusted by the user is still kept, unsuitable display screen brightness may cause the user to be unable to normally watch content in the display screen, affecting the user experience.

SUMMARY

Based on the foregoing content, it is necessary to provide a method for adjusting display screen brightness, an electronic device, and a storage medium, to ensure that set display screen brightness or manually adjusted display screen brightness after an electronic device is off and then is on meets a user requirement.

According to a first aspect, this application provides a method for adjusting display screen brightness, including: setting display screen brightness in response to an automatic brightness setting instruction; adjusting the display screen brightness in response to a brightness setting instruction generated by manually adjusting brightness by a user; determining, when a display screen is on again after the display screen is off, whether a mechanism of clearing the display screen brightness manually adjusted by the user is triggered; if the mechanism of clearing the display screen brightness manually adjusted by the user is triggered, setting the display screen brightness again in response to the automatic brightness setting instruction; determining, in response to an operation of manually adjusting the display screen brightness again by the user, whether the operation of manually adjusting the display screen brightness again by the user is the same as a previous operation of manually adjusting the display screen brightness; and if the operation of manually adjusting the display screen brightness again by the user is the same as the previous operation of manually adjusting the display screen brightness, adjusting, in response to a brightness setting instruction generated by manually adjusting the display screen brightness again by the user, the display screen brightness set again. Through the technical solution, it can be ensured that after a display screen is off and then is on, display screen brightness manually adjusted by a user meets a user actual requirement.

In a possible implementation, the setting display screen brightness in response to an automatic brightness setting instruction includes: determining whether a use scenario of an electronic device is a preset first use scenario or a preset second use scenario: if it is determined that the use scenario of the electronic device is the preset first use scenario, determining a brightness value in a first brightness range as the display screen brightness; if it is determined that the use scenario of the electronic device is the preset second use scenario, determining a brightness value in a second brightness range as the display screen brightness: mapping the determined display screen brightness in the first brightness range or the second brightness range to display screen brightness in a third brightness range; and driving the display screen to perform display based on the display screen brightness in the third brightness range. Through the technical solution, the display screen brightness may be automatically set based on the use scenario of the electronic device, so that the set display screen brightness meets the user actual requirement.

In a possible implementation, the preset first use scenario includes: the electronic device runs a video application, the electronic device runs two-dimensional code software, and the electronic device is in a front-facing camera fill-in light state, and the preset second use scenario includes: the electronic device is in a thermal limit state, the electronic device is in a front-facing camera brightness limit state, the electronic device is in a low power mode, the electronic device is in a face unlock state, and the electronic device is in a scene recognition state. Through the technical solution, the electronic device may automatically set the display screen brightness based on a specific use scenario, so that the set display screen brightness meets the user actual requirement.

In a possible implementation, the setting display screen brightness in response to an automatic brightness setting instruction includes: sensing, when the display screen is on, ambient light brightness of an environment of the electronic device by using an ambient light sensor: determining, in response to an automatic brightness setting instruction generated based on the ambient light brightness, a preset ambient light brightness interval within which the ambient light brightness falls; determining, based on a correspondence between the brightness value in the second brightness range and the preset ambient light brightness interval, display screen brightness corresponding to the preset ambient light brightness interval within which the ambient light brightness falls; mapping the display screen brightness in the second brightness range to the display screen brightness in the third brightness range; and driving the display screen to perform display based on the display screen brightness in the third brightness range. Through the technical solution, the display screen brightness may be automatically set based on ambient light brightness of an environment of the electronic device, so that the set display screen brightness is adapted to a use environment.

In a possible implementation, the sensing, when the display screen is on, ambient light brightness of an environment of the electronic device by using an ambient light sensor includes: when the display screen is switched from a screen-off state to a screen-on state, generating a trigger instruction to trigger the ambient light sensor to sense ambient light, converting a sensed optical signal into an electrical signal, converting the electrical signal into brightness information, and generating the automatic brightness setting instruction based on the brightness information. Through the technical solution, after the display screen is off and then is on, the display screen brightness may be automatically set based on the ambient light brightness, so that the display screen brightness set after the display screen is on is adapted to the use environment.

In a possible implementation, the sensing, when the display screen is on, ambient light brightness of an environment of the electronic device by using an ambient light sensor includes: when the display screen is in a screen-on state, sensing, by the ambient light sensor, ambient light at a preset sampling rate, converting a sensed optical signal into an electrical signal, converting the electrical signal into brightness information, and generating the automatic brightness setting instruction based on the brightness information when the brightness information changes and lasts for a preset time. Through the technical solution, when the ambient light brightness of the user environment of the electronic device changes, the display screen brightness may be automatically adjusted based on the ambient light brightness, so that the display screen brightness is adapted to the use environment.

In a possible implementation, a mapping relationship among brightness values in the first brightness range, the second brightness range, and the third brightness range includes: a brightness value in the first brightness range corresponds to a brightness value in the second brightness range or a sub-brightness range of the second brightness range, the sub-brightness range of the second brightness range corresponds to a sub-brightness range of the third brightness range, and a brightness value in the second brightness range corresponds to a brightness value in the third brightness range or a sub-brightness range of the third brightness range. Through the technical solution, the display screen brightness may be accurately set based on a plurality of brightness ranges.

In a possible implementation, the first brightness range is from 0 to 1, the second brightness range is from 0 to 255, and the third brightness range is from 0 to 10000. Through the technical solution, the display screen brightness may be accurately mapped based on different brightness ranges.

In a possible implementation, the driving the display screen to perform display based on the display screen brightness in the third brightness range includes: obtaining maximum display brightness supported by the display screen; establishing a mapping relationship between a brightness value in the third brightness range and display brightness of the display screen based on the maximum display brightness; determining display brightness corresponding to the display screen brightness in the third brightness range based on the mapping relationship; setting the display screen brightness in the third brightness range to backlight brightness of the display screen; and driving, by a display driving circuit, the display screen to perform display based on the backlight brightness, so that actual display brightness of the display screen reaches the display brightness corresponding to the display screen brightness in the third brightness range. Through the technical solution, the display screen may be driven to perform display based on backlight brightness of the display screen and actually supported maximum display brightness, so that actual display brightness of the display screen is adapted to the use environment of the electronic device or meets the user actual requirement.

In a possible implementation, the adjusting the display screen brightness in response to a brightness setting instruction generated by manually adjusting brightness by a user includes: adjusting the set display screen brightness in the third brightness range in response to an operation of manually adjusting a brightness bar by the user; and driving the display screen to perform display based on adjusted display screen brightness in the third brightness range. Through the technical solution, the automatically set display screen brightness may be adjusted based on preference of the user for the display screen brightness, so that the display screen brightness further meets a use habit of the user.

In a possible implementation, the adjusting the display screen brightness in response to a brightness setting instruction generated by manually adjusting brightness by a user further includes: setting brightness adjustment animation of the display screen based on the adjusted display screen brightness, and displaying the brightness adjustment animation when the display screen is driven to perform display based on the adjusted display screen brightness in the third brightness range. Through the technical solution, brightness adjustment animation may be displayed, so that the user can visually sense adjustment of the display screen brightness.

In a possible implementation, the setting brightness adjustment animation of the display screen based on the adjusted display screen brightness includes: setting a brightness change process of gradually changing from the set display screen brightness to the adjusted display screen brightness of the display screen, and drawing the brightness bar to indicate the adjusted display screen brightness. Through the technical solution, the user can visually sense adjustment of the display screen brightness from two dimensions of a transition effect of the display screen brightness and adjustment of a brightness bar of a user interface.

In a possible implementation, the determining, when a display screen is on again after the display screen is off, whether a mechanism of clearing the display screen brightness manually adjusted by the user is triggered includes: when the display screen is on again after the display screen is off, determining whether at least one of the following preset conditions is met: a time interval between a current moment and a moment at which the user manually adjusts the display screen brightness last time is greater than or equal to a first preset time interval, the display screen is on and a time interval between a screen-on moment and a previous screen-off moment is greater than or equal to a second preset time interval, and ambient light brightness corresponding to a case that the user manually adjusts the display screen brightness last time is greater than or equal to preset brightness; if the at least one preset condition is met, determining that the mechanism of clearing the display screen brightness manually adjusted by the user is triggered; and if all the preset conditions are not met, determining that the mechanism of clearing the display screen brightness manually adjusted by the user is not triggered. Through the technical solution, when a preset condition is met, clearing preference of the user for the automatically set display screen brightness may be triggered, so that the setting of the display screen brightness meets the user actual requirement.

In a possible implementation, the determining, in response to an operation instruction of manually adjusting the display screen brightness again by the user, whether the operation of manually adjusting the display screen brightness again by the user is the same as a previous operation of manually adjusting the display screen brightness includes: when the display screen detects an operation of manually adjusting a brightness bar again by the user, determining whether the operation of manually adjusting the brightness bar again by the user is the same as a previous operation of manually adjusting the brightness bar: if it is determined that the operation of manually adjusting the brightness bar again by the user is the same as the previous operation of manually adjusting the brightness bar, determining that the operation of manually adjusting the display screen brightness again by the user is the same as the previous operation of manually adjusting the display screen brightness; and if it is determined that the operation of manually adjusting the brightness bar again by the user is different from the previous operation of manually adjusting the brightness bar, determining that the operation of manually adjusting the display screen brightness again by the user is different from the previous operation of manually adjusting the display screen brightness. Through the technical solution, when it is determined that operations of adjusting the brightness bar are consistent, the display screen brightness may be adjusted, and it is ensured that manual adjustment of the display screen brightness meets the user requirement.

In a possible implementation, the method further includes: if the operation of manually adjusting the display screen brightness again by the user is different from the previous operation of manually adjusting the display screen brightness, keeping the display screen brightness set again unchanged. Through the technical solution, when it is determined that the operations of adjusting the brightness bar are inconsistent, the display screen brightness may not be adjusted, to avoid adjustment of the display screen brightness caused by a misoperation of the user.

In a possible implementation, the method further includes: if the mechanism of clearing the display screen brightness manually adjusted by the user is not triggered, keeping the display screen brightness adjusted last time unchanged. Through the technical solution, when clearing preference of the user for the automatically set display screen brightness is not triggered, the display screen brightness may be kept unchanged, so that the setting of the display screen brightness meets the user actual requirement.

In a possible implementation, the method further includes: resetting the display screen brightness in response to the automatic brightness setting instruction generated by restart of an electronic device or restart of an automatic brightness adjustment option. Through the technical solution, when the electronic device restarts or the automatic brightness adjustment option restarts, the display screen brightness may be automatically set again, to clear the automatically set or manually adjusted display screen brightness.

In a possible implementation, the method further includes: adjusting, in response to a brightness adjustment instruction generated by a change of a use environment of an electronic device, display screen brightness adjusted last time. Through the technical solution, when the use environment changes, the manually adjusted display screen brightness may be adaptively adjusted.

In a possible implementation, the adjusting, in response to a brightness adjustment instruction generated by a change of a use environment of an electronic device, display screen brightness adjusted last time includes: sensing ambient light brightness of an environment of the electronic device by using an ambient light sensor; when the ambient light brightness sensed by using the ambient light sensor changes, determining that the use environment of the electronic device changes, and generating the brightness adjustment instruction; and adjusting, in response to the brightness adjustment instruction, the display screen brightness manually adjusted by the user last time. Through the technical solution, by detecting a change of the ambient light brightness, it may be determined that the use environment of the electronic device changes, so that the manually adjusted display screen brightness is adaptively adjusted.

According to a second aspect, this application provides an electronic device, including a memory and a processor, where the memory is configured to store program instructions; and the processor is configured to read and execute the program instructions stored in the memory, and when the program instructions are executed by the processor, the electronic device is enabled to perform the method for adjusting display screen brightness.

According to a third aspect, this application provides a computer storage medium, storing program instructions, where when the program instructions are run on an electronic device, the electronic device is enabled to perform the method for adjusting display screen brightness.

In addition, for technical effects brought by the second aspect and the third aspect, refer to the related descriptions of the method in the designs of the method part. Details are not described herein again.

According to the method for adjusting display screen brightness, the electronic device, and the storage medium provided in embodiments of this application, depending on a case that a mechanism of clearing display screen brightness manually adjusted by a user is not triggered, after a display screen is off and then is on, the display screen brightness manually adjusted by the user is kept unchanged. Depending on a case that the mechanism of clearing the display screen brightness manually adjusted by the user is triggered, after the display screen is off and then is on, the display screen brightness is automatically reset, and the display screen brightness is adjusted based on a same manual adjustment operation of the user, to ensure that the automatically set display screen brightness or the display screen brightness manually adjusted by the user after the electronic device is off and then is on meets a user actual requirement, and ensure that the user can normally watch content on the display screen, thereby improving user experience.

BRIEF DESCRIPTION OF DRAWINGS

FIG. 1A is a schematic diagram of display screen brightness according to an embodiment of this application;

DESCRIPTION OF EMBODIMENTS

Figure 1B:
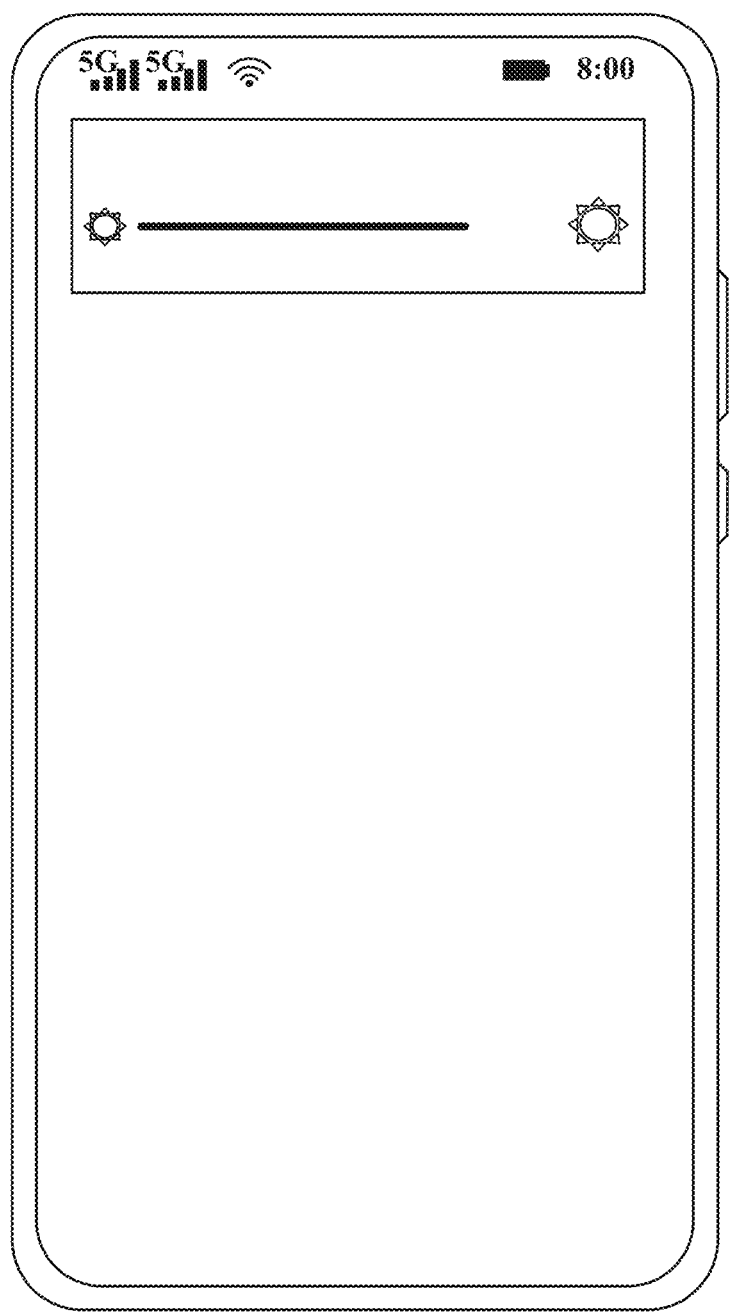
FIG. 1B is a schematic diagram of a display screen brightness adjustment interface according to an embodiment of this application.

For ease of understanding, some concepts related to embodiments of this application are explained as examples for reference.

It should be noted that in embodiments of this application, terms "first" and "second" are used merely for the purpose of description, and shall not be construed as indicating or implying relative importance or implying a quantity of indicated technical features. Therefore, a feature limited by "first" or "second" may explicitly or implicitly include one or more features. In the descriptions of embodiments of this application, words such as "example" or "for example" are used to mean an example, an illustration, or a description. Any embodiment or design scheme described by using "example" or "for example" in embodiments of this application should not be explained as being more preferred or having more advantages than another embodiment or design scheme. Exactly, use of the terms such as "example" or "for example" is intended to present a relative concept in a specific manner.

Unless otherwise defined, meanings of all technical and scientific terms used in this specification are the same as those usually understood by a person skilled in the art to which this application belongs. Terms used in the specification of this application are merely intended to describe objectives of the specific embodiments, but are not intended to limit this application. It should be understood that in this application, "/" means "or" unless otherwise specified. For example, A/B may represent A or B. In this application, "and/or" describes only an association relationship for describing associated objects and indicates that three relationships may exist. For example, A/B may indicate the following three cases: Only A exists, both A and B exist, and only B exists. "At least one" means one or more. "A plurality of" means two or more. For example, at least one of a, b, or c may indicate seven cases: a, b, c, a and b, a and c, b and c, and a, b, and c.

A user interface (UI) in embodiments of this application is a media interface for interaction and information exchange between an application or an operating system and a user, and can convert information between an internal form and a form acceptable by the user. A user interface of an application is source code written in a specific computer language such as Java or extensible markup language (XML). The source code of the interface is parsed and rendered on an electronic device, and is finally presented as content that can be recognized by the user, for example, a control such as a picture, a text, or a button. A control is a basic element of a user interface. Typical controls include a button, widget, a toolbar, a menu bar, a text box, a scrollbar, an image, and a text. The attributes and content of the controls in the interface are defined by tags or nodes. For example, XML specifies the controls included in the interface through nodes such as <Textview>, <ImgView>, and <VideoView>. One node corresponds to one control or attribute in the interface, and the node is parsed and rendered, and is then presented as user-visible content. In addition, interfaces of many applications, such as hybrid applications, usually further include web pages. A web page, also referred to as a page, may be understood as a special control embedded in an application interface. The web page is source code written in a specific computer language, such as hyper text markup language (HTML), cascading style sheets (CSS), and JavaScript (JS). The source code of the web page may be loaded and displayed, by using a browser or a web page display component similar to a browser function, as content recognizable by a user. The specific content included in the web page is also defined by tags or nodes in the source code of the web page. For example, HTML defines elements and attributes of the web page through <p>, <img>, <video>, and <canvas>.

A common presentation form of the user interface is a graphical user interface (GUI), which refers to a user interface that is displayed in a graphical manner and that is related to a computer operation. It may be an interface element such as an icon, a window; or a control that is displayed on a display screen of an electronic device.

The following embodiments and features in the embodiments may be mutually combined in a case that no conflict occurs.

To better understand the method for adjusting display screen brightness provided in embodiments of this application, an application scenario of the method for adjusting display screen brightness in this application is first described below.

FIG. 1A is a schematic diagram of display screen brightness according to an embodiment of this application. When a display screen is on, an ambient light sensor of an electronic device may acquire ambient light brightness and the electronic device sets suitable display screen brightness based on the ambient light brightness. For example, when the ambient light brightness is 5 lux, the display screen brightness is set to 18 levels, and when the ambient light brightness is 20 lux, the display screen brightness is set to 58 levels.

FIG. 1B is a schematic diagram of a display screen brightness adjustment interface according to an embodiment of this application. Different users have inconsistent degrees of preference for display screen brightness automatically set by the electronic device, or a same user has inconsistent degrees of preference for display screen brightness automatically set by the electronic device under different ambient light brightness. Therefore, the user may drag a brightness bar on a display screen brightness adjustment interface, to manually adjust the display screen brightness based on the display screen brightness automatically set by the electronic device, so that the display screen brightness is adapted to a personal requirement. For example, as shown in FIG. 1A, when the ambient light brightness is 50 lux, the display screen brightness is set to 87.5 steps, and the display screen brightness manually adjusted by the user is 107.98 levels. When the ambient light brightness is 100 lux, the display screen brightness is set to 95 levels, and the display screen brightness manually adjusted by the user is 120.6 levels.

Figure 1C:
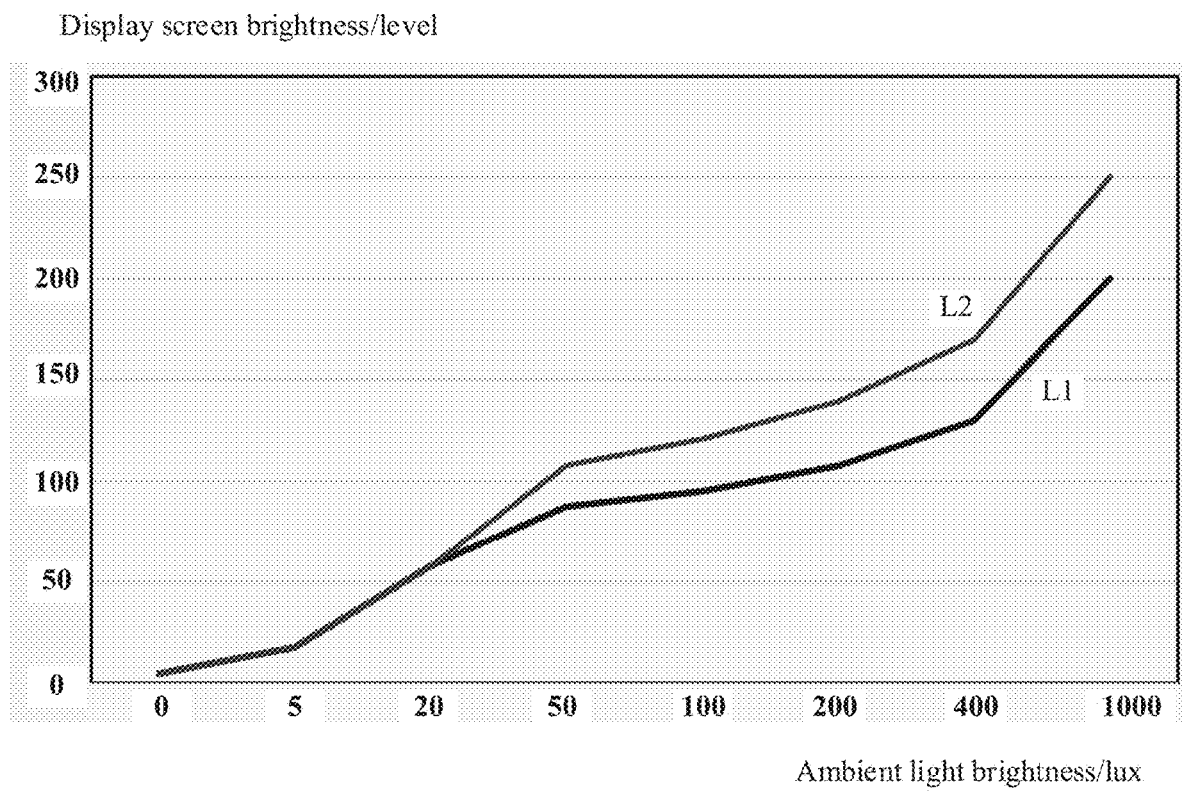
FIG. 1C is a schematic diagram of a default brightness curve and a brightness curve after manual adjustment according to an embodiment of this application.

FIG. 1C is a schematic diagram of a default brightness curve and a brightness curve after manual adjustment according to an embodiment of this application. Under different ambient light brightness, there is a difference between a default brightness curve L1 of the electronic device and a brightness curve L2 after manual adjustment of a user.

Figure 2:
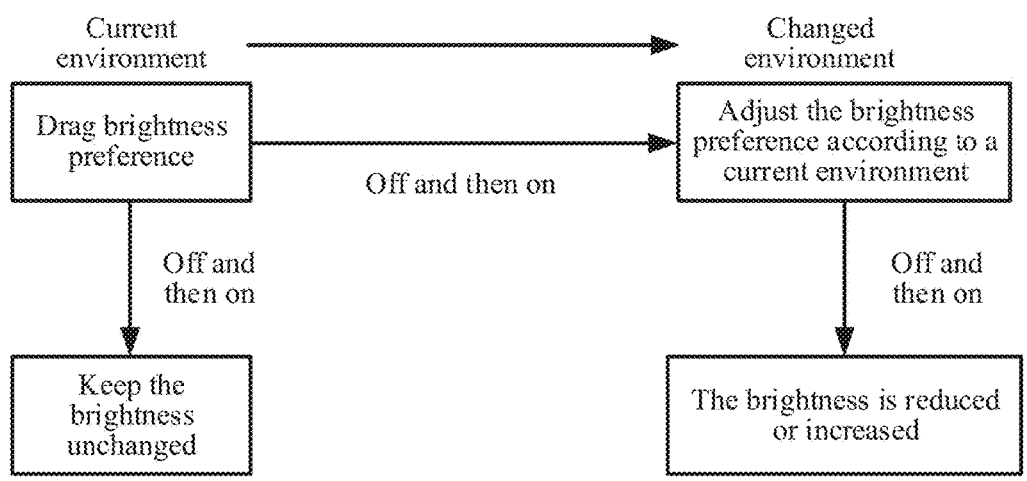
FIG. 2 is a schematic diagram of an adjustment architecture of display screen brightness in the related art.

FIG. 2 is a schematic diagram of an adjustment architecture of display screen brightness in conventional technologies. After a user manually adjusts display screen brightness, without changing a use environment (that is, without changing ambient light brightness), a screen of an electronic device is off and then is on, and the display screen brightness is kept unchanged, that is, the display screen brightness adjusted by the user is still kept. With changing the use environment (that is, with changing the ambient light brightness), the screen of the electronic device is off and then is on, and the display screen brightness may be adaptively adjusted based on changed ambient light brightness. For example, when the ambient light brightness is increased, the display screen brightness adjusted by the user is increased, and when the ambient light brightness is reduced, the display screen brightness adjusted by the user is reduced.

However, the user may not accept display screen brightness adaptively adjusted by the electronic device under different ambient light brightness. Therefore, when the use environment changes, the display screen brightness adaptively adjusted by the electronic device does not meet a user requirement after the screen of the electronic device is off and then is on, causing the user to be unable to normally watch content in a display screen and affecting user experience. In addition, the user may manually adjust the display screen brightness due to a misoperation. Therefore, both the manually adjusted display screen brightness maintained by the electronic device when the use environment does not change, and the display screen brightness adaptively adjusted by the electronic device when the use environment changes do not meet the user requirement, causing the user to be unable to normally watch the content in the display screen and affecting user experience.

Figure 3:
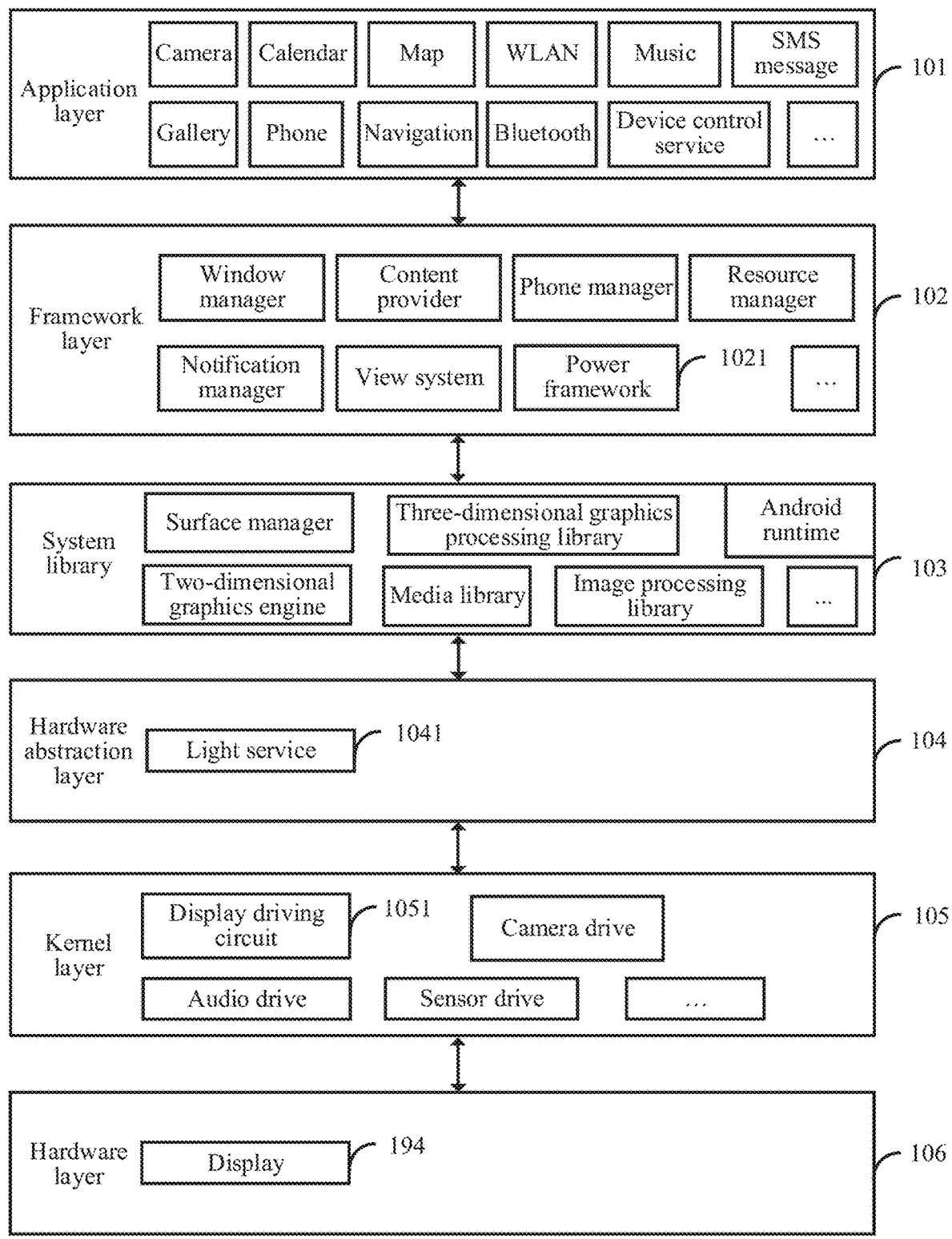
FIG. 3 is a diagram of a software architecture of an electronic device according to an embodiment of this application.

FIG. 3 is a diagram of a software architecture of an electronic device according to an embodiment of this application. A layered architecture divides software into several layers, with each layer having a clear role and responsibilities. Layers communicate with each other through a software interface. For example, the Android system is divided into four layers: an application layer 101, a framework layer 102, Android runtime and system library 103, a hardware abstraction layer 104, a kernel layer 105, and a hardware layer 106.

The application layer may include a series of application packages. For example, the application package may include Camera, Gallery, Calendar, Call, Map, Navigation, WLAN, Bluetooth, Music, Video, SMS message, Device control service, and another application.

The framework layer provides an application programming interface (API) and a programming framework for the applications at the application layer. The application framework layer includes some predefined functions. For example, the application framework layer may include a window manager, a content provider, a view system, a phone manager, a resource manager, a notification manager, and the like.

The window manager is configured to manage a window program. The window manager may obtain a size of a display screen, determine whether there is a status bar, perform screen locking, perform screen capturing, and so on. The content provider is configured to store and obtain data, so that the data can be accessed by an application. The data may include a video, an image, an audio, calls made and answered, a browsing history and bookmarks, an address book, and the like. The view system includes a visual control such as a control for text display or a control for picture display. The view system may be configured to construct an application. A display interface may be formed by one or more views. For example, a display interface including an SMS notification icon may include a view for displaying text and a view for displaying a picture. The phone manager is configured to provide a communication function of the electronic device, for example, call state management (including getting through, hang-up, and the like). The resource manager provides various resources for an application, for example, a localized character string, an icon, a picture, a layout file, and a video file. The notification manager enables an application to display notification information on a status bar. The notification information may be a message used to indicate a notification type, and may automatically disappear after a short stay without interacting with a user. For example, the notification manager is configured to notify download completion, a message prompt, and the like. The notification manager may alternatively be a notification that appears on a top status bar of the system in a form of a graph or a scroll bar text, for example, a notification of an application running on the background, or may be a notification that appears on the screen in a form of a dialog window. For example, text information is prompted on a status bar, a prompt tone is made, the electronic device vibrates, or an indicator light flashes.

The Android Runtime includes a kernel library and a virtual machine. The Android runtime is responsible for scheduling and managing the Android system. The kernel library includes two parts: a function that needs to be called in Java language and a kernel library of Android.

The application layer and the framework layer run on a virtual machine. The virtual machine executes java files of the application layer and the framework layer as binary files. The virtual machine is used to execute functions such as object lifecycle management, stack management, thread management, security and exception management, and garbage collection.

The system library may include a plurality of functional modules, such as a surface manager, a media library (Media Libraries), a three-dimensional graphics processing library (for example, OpenGL ES), a 2D graphics engine (for example, SGL).

The surface manager is configured to manage a display subsystem and provide fusion of 2D and 3D layers for a plurality of applications. The media library supports play back and recording of a plurality of common audio and video formats, a static image file, and the like. The media library may support a plurality of audio and video encoding formats, such as MPEG4, H.264, MP3, AAC, AMR, JPG, and PNG. The three-dimensional graphics processing library is configured to implement three-dimensional drawing, image rendering, compositing, and layer processing. The 2D graphics engine is a drawing engine for 2D drawings.

The hardware abstraction layer runs in user space, encapsulates a kernel layer drive, and provides a call interface to an upper layer.

The kernel layer is a layer between hardware and software. The kernel layer includes at least a display drive, a camera drive, an audio drive, and a sensor drive.

The kernel layer is a core of an operating system of an electronic device, and is first-layer software expansion based on hardware. The kernel layer provides a most basic function of the operating system, is a basis of the operating system, and is responsible for managing a system process, a memory, a device driver, a file, and a network system, and determines performance and stability of the system. For example, a kernel may determine when an application operates on a specific piece of hardware.

The kernel layer includes a program closely related to hardware, such as an interrupt handler and a device driver, further includes a basic and common module with relatively high operating frequency, such as a clock management module, a process scheduling module, and further includes a key data structure. The kernel layer may be disposed in a processor, or may be solidified in an internal memory.

The hardware layer is hardware of the electronic device, and the hardware layer includes at least a display screen 194.

To resolve the problem that the display screen brightness adaptively adjusted by the electronic device does not meet the user requirement, causing the user to be unable to normally watch the content in the display screen, an embodiment of this application provides a method for adjusting display screen brightness.

Figure 4:
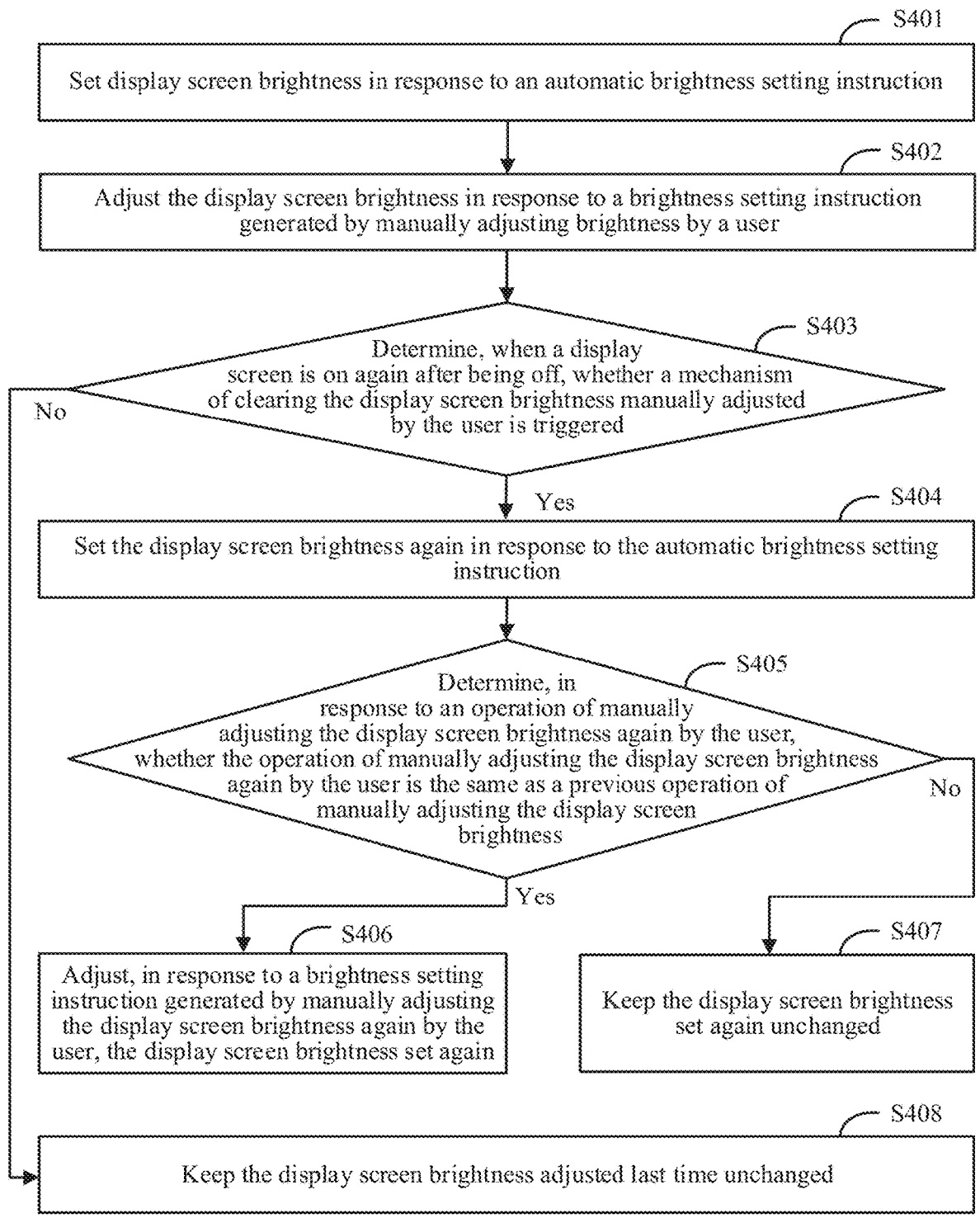
FIG. 4 is a flowchart of a method for adjusting display screen brightness according to an embodiment of this application.

FIG. 4 is a flowchart of a method for adjusting display screen brightness according to an embodiment of this application. The method is applicable to an electronic device, and the method for adjusting display screen brightness includes the following steps.

S401. Set display screen brightness in response to an automatic brightness setting instruction.

In an embodiment of this application, the set display screen brightness is a backlight brightness level of a display screen with a unit being step. A detailed process of the setting display screen brightness in response to an automatic brightness setting instruction includes: setting the display screen brightness based on the automatic brightness setting instruction generated based on a use scenario of the electronic device.

Figure 5:
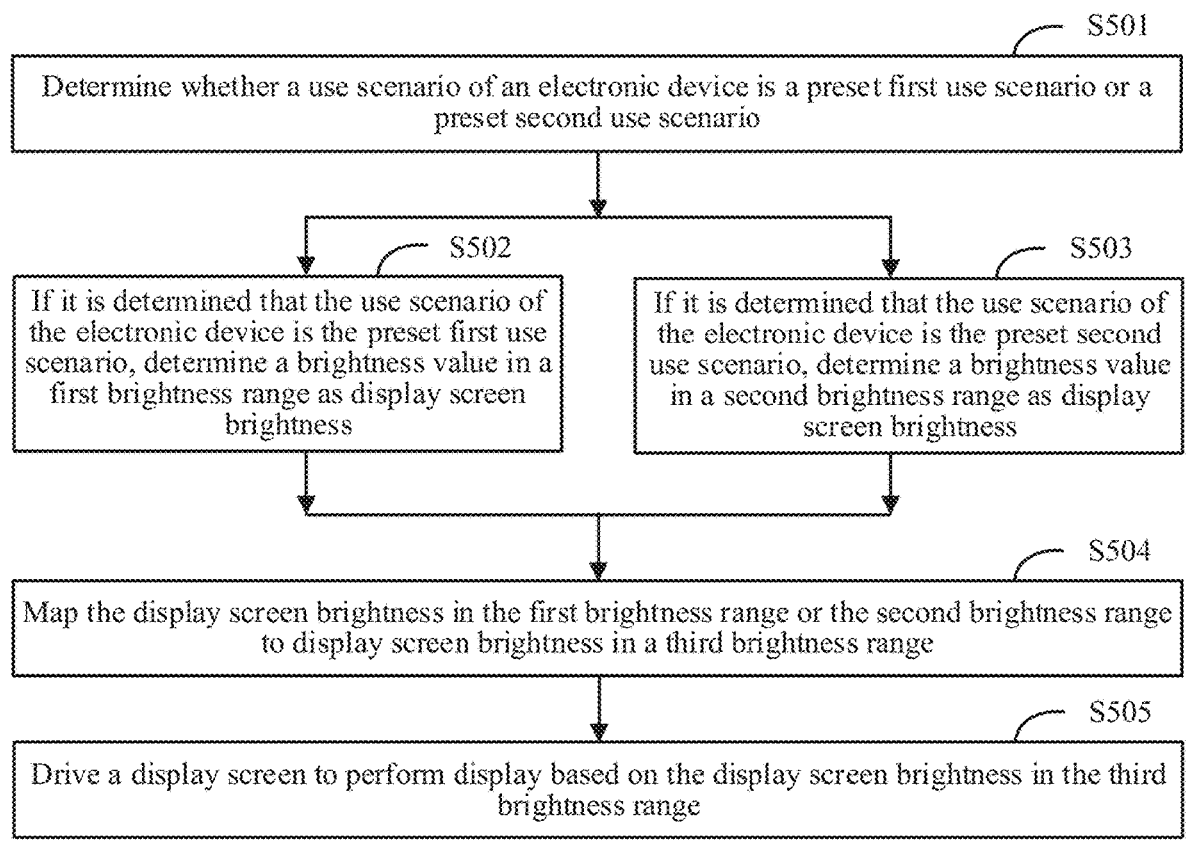
FIG. 5 is a flowchart of setting display screen brightness based on an automatic brightness setting instruction generated based on a use scenario of an electronic device according to an embodiment of this application.

In an embodiment of this application, as shown in FIG. 5, a detailed process of the setting the display screen brightness based on the automatic brightness setting instruction generated based on a use scenario of the electronic device specifically includes the following steps.

S501. Determine whether a use scenario of an electronic device is a preset first use scenario or a preset second use scenario.

In an embodiment of this application, whether the use scenario of the electronic device is the preset first use scenario or the preset second use scenario is determined by an application layer.

The electronic device presets at least the first use scenario and the second use scenario. The preset first use scenario includes, but not limited to: the electronic device runs a video application, the electronic device runs two-dimensional code software, and the electronic device is in a front-facing camera fill-in light state. Specifically, that the electronic device runs the two-dimensional code software is that a two-dimensional code is being displayed on a display screen of the electronic device. That the electronic device is in the front-facing camera fill-in light state is that the electronic device is using a front-facing camera to perform photographing and ambient light brightness is less than preset brightness. Optionally, the preset brightness is 20 lux. The preset second use scenario includes, but not limited to: the electronic device is in a thermal limit state, the electronic device is in a front-facing camera brightness limit state, the electronic device is in a low power mode, the electronic device is in a face unlock state, and the electronic device is in a scene recognition state. Specifically, that the electronic device is in the thermal limit state is that a housing temperature or a mainboard temperature of the electronic device is greater than or equal to a threshold temperature. Optionally, the threshold temperature is 50° C. That the electronic device is in the front-facing camera brightness limit state is that the electronic device is using the front-facing camera to perform photographing. That the electronic device is in the low power mode is that power of the electronic device is less than or equal to a preset percentage. Optionally, the preset percentage is 20%. That the electronic device is in the face unlock state is that the electronic device is in a screen-on state and in a state in face unlocking is performed for a locked state. That the electronic device is in the scene recognition state is that the electronic device enables a rear-facing camera to perform photographing to recognize a state of a target object.

S502. If it is determined that the use scenario of the electronic device is the preset first use scenario, determine a brightness value in a first brightness range as the display screen brightness.

In an embodiment of this application, if it is determined that the use scenario of the electronic device is the preset first use scenario, the automatic brightness setting instruction is transferred to a power framework of a framework layer (for example, as shown in FIG. 3, the framework layer 102 includes a power framework 1021), and the power framework determines the brightness value in the first brightness range as the display screen brightness.

Optionally, the first brightness range is from 0 to 1. If it is determined that the use scenario of the electronic device is the preset first use scenario, any brightness value in the first brightness range may be determined as the display screen brightness, for example, a brightness value 1 in the first brightness range 0 to 1 is determined as the display screen brightness.

It should be noted that in the first use scenario, for example, when the electronic device is playing a video, displaying a two-dimensional code, or using a front-facing camera to perform photographing under relatively low ambient light brightness, relatively high or highest display screen brightness needs to be set, and a quantity of levels of required display screen brightness is relatively small. Therefore, the display screen brightness is obtained based on a relatively small brightness range.

S503. If it is determined that the use scenario of the electronic device is the preset second use scenario, determine a brightness value in a second brightness range as the display screen brightness.

In an embodiment of this application, if it is determined that the use scenario of the electronic device is the preset second use scenario, the automatic brightness setting instruction is transferred to the power framework of the framework layer, and the power framework determines the display screen brightness based on the second brightness range.

In an embodiment of this application, the second brightness range may be divided into a plurality of sub-brightness ranges, and different sub-brightness ranges may be associated with different use scenarios. The determining the display screen brightness based on a brightness value in a second brightness range includes: determining a sub-brightness range corresponding to the second use scenario in the second brightness range, determining a brightness value in the sub-brightness range based on ambient light brightness, and determining the brightness value in the sub-brightness range as the display screen brightness. Optionally, the second brightness range is from 0 to 255. The electronic device pre-configures a correspondence between ambient light brightness and a sub-brightness range of the second brightness range or a brightness value in the second brightness range.

Specifically, if the second use scenario is that the electronic device is in the thermal limit state or the electronic device is in the low power mode, relatively low display screen brightness needs to be set, and it is determined that the sub-brightness range is from 0 to 50. In addition, ambient light brightness of an environment of the electronic device is sensed by using an ambient light sensor, a brightness value in the sub-brightness range is determined based on the sensed ambient light brightness, and the brightness value is determined as the display screen brightness.

if the second use scenario is that the electronic device is in the front-facing camera brightness limit state, the electronic device is in the face unlock state, or the electronic device is in the scene recognition state, relatively high display screen brightness needs to be set, and it is determined that the sub-brightness range is from 180 to 255. In addition, ambient light brightness of an environment of the electronic device is sensed by using an ambient light sensor, a brightness value in the sub-brightness range is determined based on the sensed ambient light brightness, and the brightness value is determined as the display screen brightness. In another embodiment of this application, if the second use scenario is that the electronic device is in the front-facing camera brightness limit state, the electronic device is in the face unlock state, or the electronic device is in the scene recognition state, a maximum brightness value in the second brightness range may be determined as the display screen brightness. For example, the brightness value 255 is determined as the display screen brightness.

S504. Map the display screen brightness in the first brightness range or the second brightness range to display screen brightness in a third brightness range.

In an embodiment of this application, the display screen brightness in the first brightness range or the second brightness range is mapped to the display screen brightness in the third brightness range by the framework layer.

In an embodiment of this application, the electronic device pre-configures a mapping relationship among brightness values in the first brightness range, the second brightness range, and the third brightness range, and the mapping relationship includes: a brightness value in the first brightness range corresponds to a brightness value in the second brightness range or a sub-brightness range of the second brightness range, the sub-brightness range of the second brightness range corresponds to a sub-brightness range of the third brightness range, and a brightness value in the second brightness range corresponds to a brightness value in the third brightness range or a sub-brightness range of the third brightness range. Optionally, the third brightness range is from 0 to 10000.

In an embodiment of this application, the mapping the display screen brightness in the first brightness range or the second brightness range to display screen brightness in a third brightness range includes: mapping the display screen brightness in the first brightness range to a brightness value in the second brightness range or a sub-brightness range of the second brightness range, and then mapping the brightness value in the second brightness range or the sub-brightness range of the second brightness range to the display screen brightness in the third brightness range, or mapping the display screen brightness in the second brightness range to the display screen brightness in the third brightness range.

For example, when the electronic device is displaying a two-dimensional code, the determined display screen brightness is a brightness value 1 in the first brightness range, the display screen brightness is mapped to obtain a brightness value 255 in the second brightness range, and then the brightness value 255 in the second brightness range is mapped to obtain a brightness value 10000 in the third brightness range as the display screen brightness in the third brightness range.

For example, when the electronic device is in the low power mode, the determined display screen brightness is a brightness value 25 in the second brightness range, the display screen brightness is mapped to obtain a sub-brightness range 900 to 1200 in the third brightness range, and then any brightness value in the sub-brightness range 900 to 1200 may be determined as the display screen brightness in the third brightness range.

S505. Drive a display screen to perform display based on the display screen brightness in the third brightness range.

In an embodiment of this application, as shown in FIG. 3, the hardware abstraction layer 104 includes a light service (LightsService) 1041, configured to control an optical device of the electronic device, and the kernel layer 105 includes a display driving circuit 1051. The optical device includes, but not limited to, a display screen backlight light source, and an indicator.

In an embodiment of this application, the driving a display screen to perform display based on the display screen brightness in the third brightness range includes: in the framework layer, obtaining maximum display brightness supported by the display screen, establishing a mapping relationship between a brightness value in the third brightness range and display brightness of the display screen based on the maximum display brightness, determining display brightness corresponding to the display screen brightness in the third brightness range based on the mapping relationship, and transferring the display screen brightness in the third brightness range and the corresponding display brightness to the hardware abstraction layer. In the hardware abstraction layer, the light service sets the determined display screen brightness in the third brightness range to backlight brightness of the display screen in the kernel layer. In the kernel layer, the display driving circuit drives the display screen to perform display based on the set backlight brightness, so that actual display brightness of the display screen reaches the display brightness corresponding to the display screen brightness.

It should be noted that the display screen brightness in the first brightness range, the second brightness range, and the third brightness range is used for representing a backlight brightness level of the display screen with a unit being a level, and the display brightness of the display screen is actual light intensity displayed by the display screen in a display process, with a unit being nit.

Figures 6, 7:
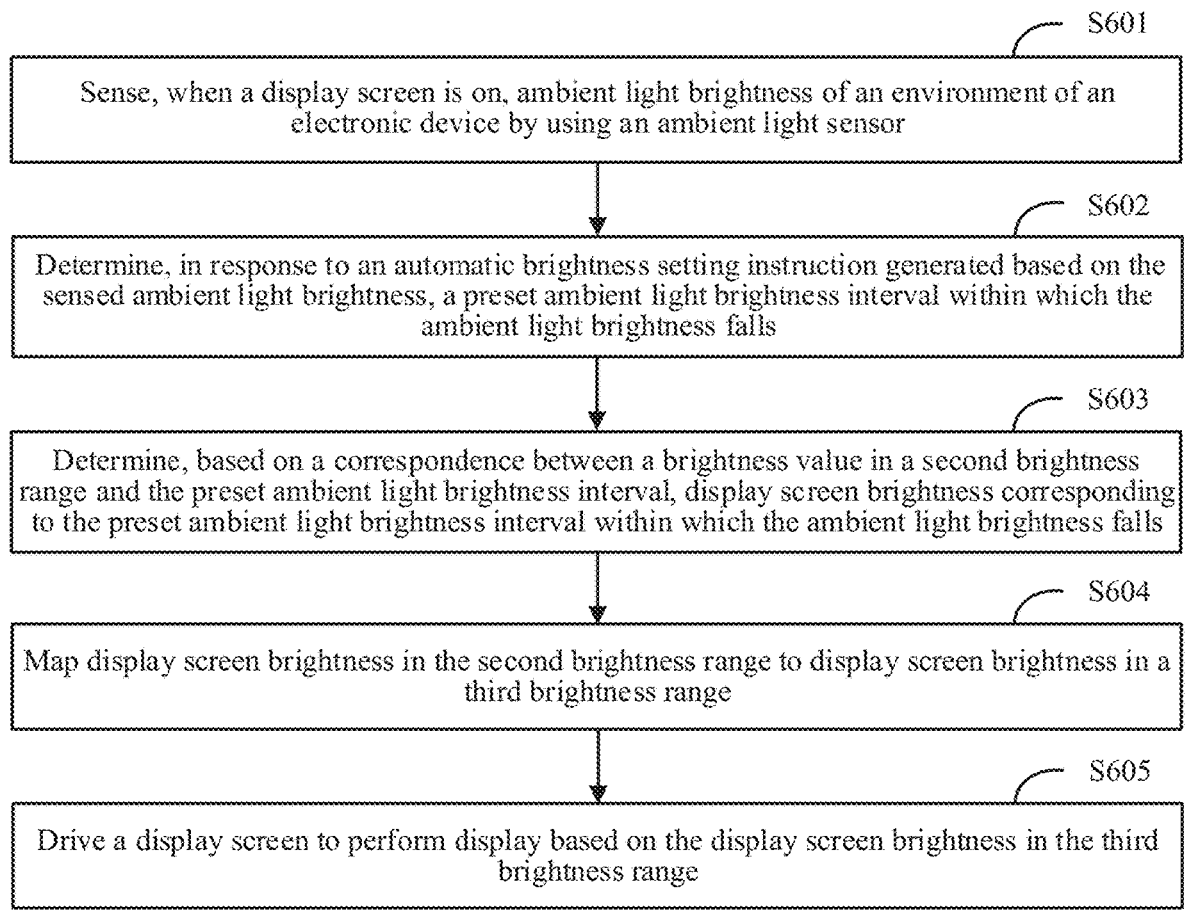
FIG. 6 is a flowchart of setting display screen brightness based on an automatic brightness setting instruction generated based on a use scenario of an electronic device according to another embodiment of this application.
FIG. 7 is a correspondence table between a brightness value and a preset ambient light brightness interval according to an embodiment of this application.

In an embodiment of this application, in a default use scenario of the electronic device (that is, another use scenario than the preset use scenarios in the foregoing embodiment), the detailed process of the setting display screen brightness in response to an automatic brightness setting instruction is shown in FIG. 6 and specifically includes the following steps.

S601. Sense, when a display screen is on, ambient light brightness of an environment of the electronic device by using an ambient light sensor.

In an embodiment of this application, that the display screen is on is that the display screen is switched from a screen-off state to a screen-on state. The sensing, when a display screen is on, ambient light brightness of an environment of the electronic device by using an ambient light sensor is performed by the kernel layer and includes: when the display screen is switched from a screen-off state to a screen-on state, generating a trigger instruction to trigger the ambient light sensor to start to sense ambient light, converting a sensed optical signal into an electrical signal, converting the electrical signal into brightness information, and generating the automatic brightness setting instruction based on the brightness information. The brightness information obtained through conversion is the ambient light brightness of the environment of the electronic device.

In an embodiment of this application, that the display screen is on is that the display screen is continuously in a screen-on state. The sensing, when the display screen is on, ambient light brightness of an environment of the electronic device by using an ambient light sensor includes: when the display screen is in a screen-on state, sensing, by the ambient light sensor, ambient light at a preset sampling rate, converting a sensed optical signal into an electrical signal, converting the electrical signal into brightness information, and generating the automatic brightness setting instruction based on the brightness information when the sensed brightness information changes and lasts for a preset time.

S602. Determine, in response to an automatic brightness setting instruction generated based on the sensed ambient light brightness, a preset ambient light brightness interval within which the ambient light brightness falls.

In an embodiment of this application, the kernel layer transfers the ambient light brightness sensed by the ambient light sensor to the framework layer, and in the framework layer, the power framework determines the preset ambient light brightness interval within which the ambient light brightness falls.

In an embodiment of this application, the electronic device presets a plurality of ambient light brightness intervals. Optionally, the plurality of preset ambient light brightness intervals include a first interval [0, 200 lux), a second interval [200 lux, 400 lux), a third interval lux, 1000 lux), a fourth interval [1000 lux, 3000 lux), and a fifth interval [3000 lux, x).

For example, if the ambient light brightness sensed by the ambient light sensor is 300 lux, the preset ambient light brightness interval within which the ambient light brightness falls is the second interval.

S603. Determine, based on a correspondence between the brightness value in the second brightness range and the preset ambient light brightness interval, display screen brightness corresponding to the preset ambient light brightness interval within which the ambient light brightness falls.

In an embodiment of this application, the display screen brightness corresponding to the preset ambient light brightness interval within which the ambient light brightness falls is determined by the power framework in the framework layer. The display screen brightness is the brightness value in the second brightness range. Optionally, the second brightness range is from 0 to 255.

FIG. 7 is a correspondence table between a brightness value in a second brightness range and a preset ambient light brightness interval according to an embodiment of this application. In an embodiment of this application, the electronic device further sets a correspondence between a plurality of brightness values in the second brightness range and a plurality of preset ambient light brightness intervals. For example, a brightness value corresponding to the first interval is 25, a brightness value corresponding to the second interval is 55, a brightness value corresponding to the third interval is 70, a brightness value corresponding to the fourth interval is 120, and a brightness value corresponding to the fifth interval is 250.

In an embodiment of this application, functions of S602 and S603 are implemented by a program getCurrentDefaultBrightness.

S604. Map display screen brightness in the second brightness range to display screen brightness in a third brightness range.

In an embodiment of this application, the display screen brightness in the second brightness range is mapped to the display screen brightness in the third brightness range by the framework layer.

For example, the display screen brightness that is in the second brightness range and that corresponds to the preset ambient light brightness interval within which the ambient light brightness falls is 120, the display screen brightness is mapped to obtain a sub-brightness range 4500 to 5000 in the third brightness range, and then any brightness value in the sub-brightness range 4500 to 5000 may be determined as the display screen brightness in the third brightness range.

S605. Drive a display screen to perform display based on the display screen brightness in the third brightness range.

In an embodiment of this application, the driving a display screen to perform display based on the display screen brightness in the third brightness range includes: in the framework layer, obtaining maximum display brightness supported by the display screen, establishing a mapping relationship between a brightness value in the third brightness range and display brightness of the display screen based on the maximum display brightness, determining display brightness corresponding to the display screen brightness in the third brightness range based on the mapping relationship, and transferring the display screen brightness in the third brightness range and the corresponding display brightness to the hardware abstraction layer. In the hardware abstraction layer, the light service (LightsService) sets the determined display screen brightness in the third brightness range to backlight brightness of the display screen in the kernel layer. In the kernel layer, the display driving circuit drives the display screen to perform display based on the set backlight brightness, so that actual display brightness of the display screen reaches the display brightness corresponding to the display screen brightness.

In another embodiment of this application, the setting the display screen brightness based on the automatic brightness setting instruction generated based on a use scenario of the electronic device further includes: setting brightness setting animation of the display screen based on the determined display screen brightness, and displaying the brightness setting animation when the display screen is driven to perform display based on the display screen brightness in the third brightness range.

In the another embodiment of this application, the setting brightness setting animation of the display screen based on the set display screen brightness includes: determining a brightness change process of gradually changing from previous brightness to the display screen brightness of the display screen, and drawing a brightness bar to indicate the display screen brightness.

Figure 8A:
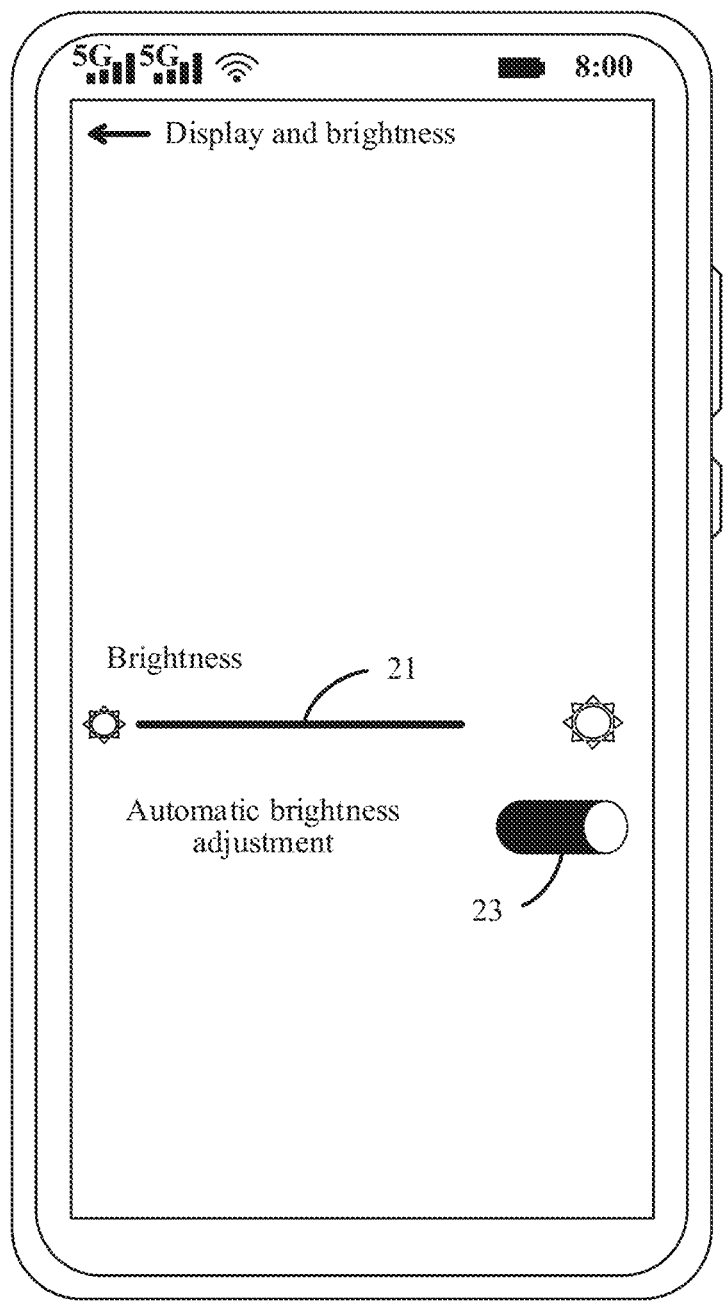
FIG. 8A is a schematic diagram of a brightness bar of a setting interface according to an embodiment of this application.
Figure 8B:
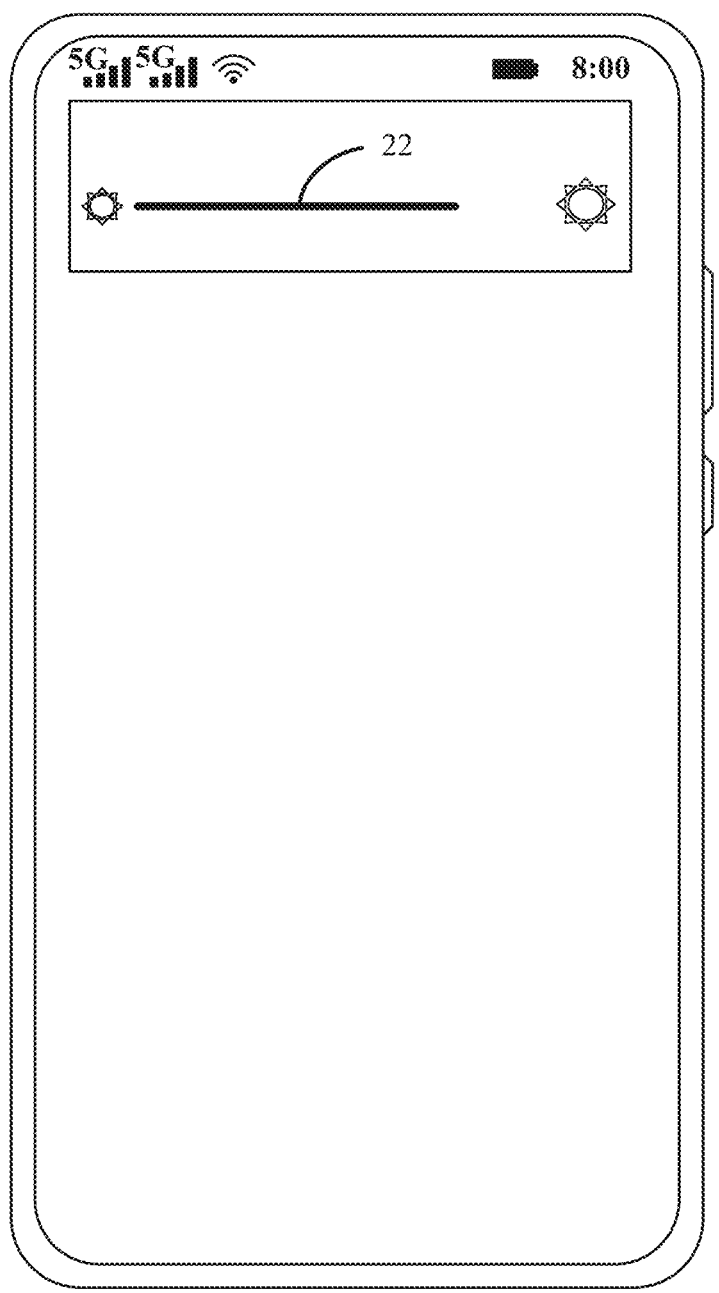
FIG. 8B is a schematic diagram of a brightness bar of a status bar interface according to an embodiment of this application.

In the another embodiment of this application, the determining a brightness change process of gradually changing from previous brightness to the display screen brightness of the display screen includes: setting a plurality of brightness values between the previous brightness and the display screen brightness. The drawing a brightness bar to indicate the display screen brightness includes: drawing the brightness bar of which a ratio of an actual length to a threshold length is equal to a ratio of actual brightness to maximum brightness of the display screen. The brightness bar includes a brightness bar (as shown in FIG. 8A) of a setting interface and a brightness bar (as shown in FIG. 8B) of a status bar (SystemUI) interface of the electronic device.

In the another embodiment of this application, when the display screen is driven to perform display based on the display screen brightness in the third brightness range, the display screen brightness is gradually changed to the display screen brightness based on the plurality of brightness values set between the previous brightness and the display screen brightness. In addition, the brightness bars in the setting interface and the status bar interface are gradually changed to the brightness bar that is currently drawn.

S402. Adjust the display screen brightness in response to a brightness setting instruction generated by manually adjusting brightness by a user.

Figure 9:
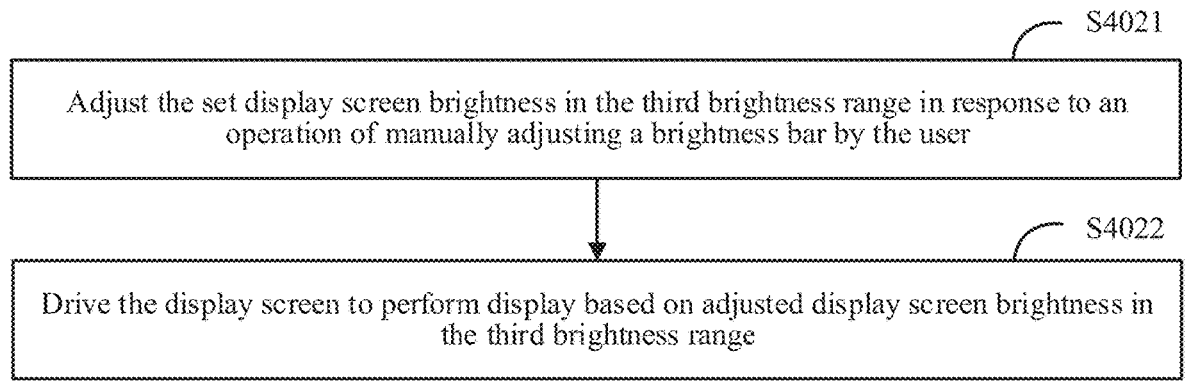
FIG. 9 is a flowchart of adjusting display screen brightness in response to a brightness setting instruction generated by manually adjusting brightness by a user according to an embodiment of this application.

In an embodiment of this application, as shown in FIG. 9, a detailed process of the adjusting the display screen brightness in response to a brightness setting instruction generated by manually adjusting brightness by a user specifically includes the following steps.

S4021. Adjust the set display screen brightness in the third brightness range in response to an operation of manually adjusting a brightness bar by the user.

In an embodiment of this application, the adjusting the set display screen brightness in the third brightness range in response to an operation of manually adjusting a brightness bar by the user includes: when the user slides the brightness bar to the right, recording an increased value of the display screen brightness by using a program updateSaveOffsetTime, and when the user stops sliding the brightness bar, adjusting the display screen brightness as a sum of the set display screen brightness in the third brightness range and the increased value of the display screen brightness; and when the user slides the brightness bar to the left, recording a reduced value of the display screen brightness by using the program updateSaveOffsetTime, and when the user stops sliding the brightness bar, adjusting the display screen brightness as a difference between the set display screen brightness in the third brightness range and the reduced value of the display screen brightness.

Figure 10A:
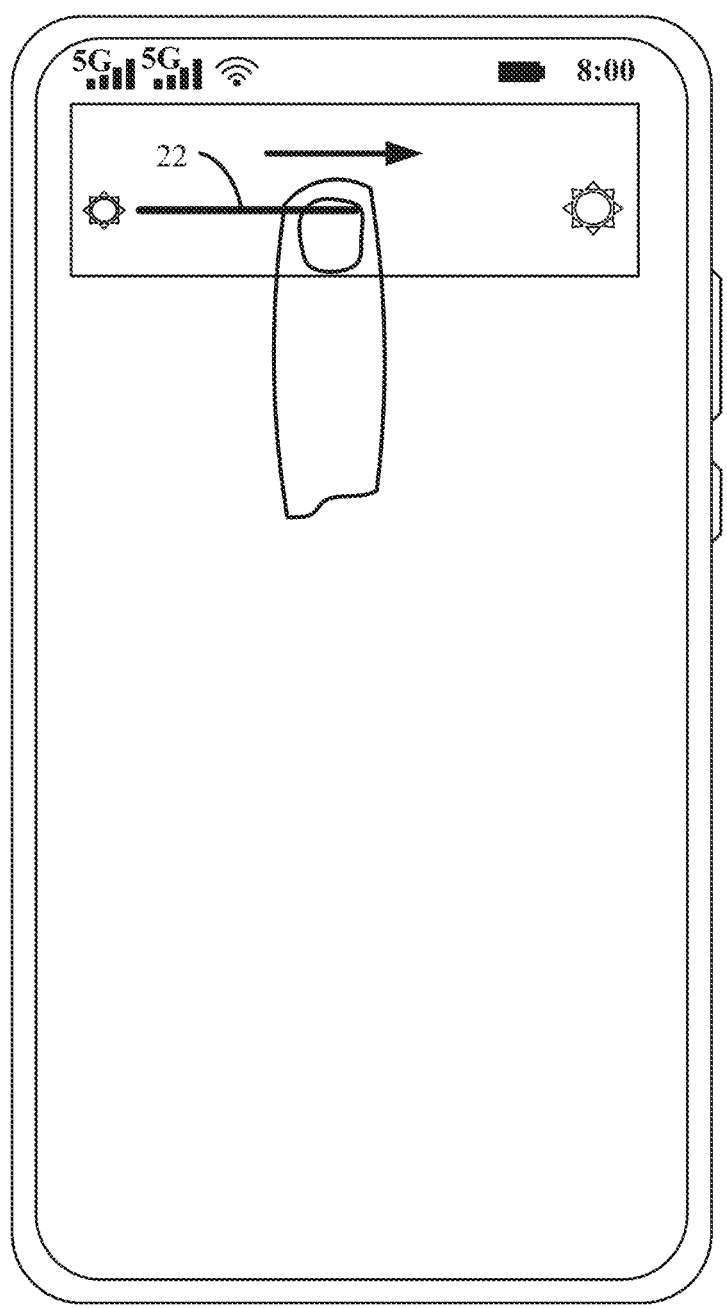
FIG. 10A is a schematic diagram in which a user adjusts a brightness bar in a status bar interface according to an embodiment of this application.
Figure 10B:
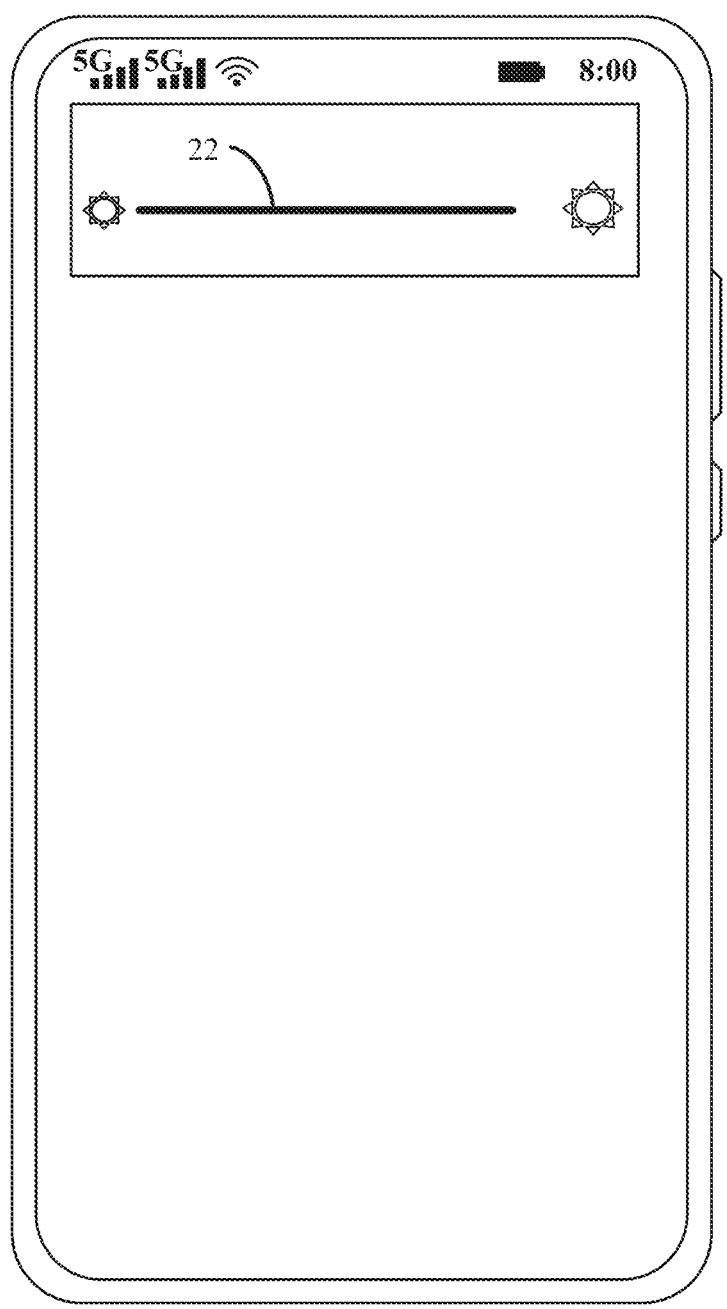
FIG. 10B is a schematic diagram of a manually adjusted brightness bar of a status bar interface according to an embodiment of this application.

For example, referring to FIG. 10A, when the user slides a brightness bar 22 in a status bar interface to the right, an increased value of the display screen brightness starts to be recorded. Referring to FIG. 10B, when the user stops sliding the brightness bar 22 in the status bar interface, the increased value of the display screen brightness is determined.

Figure 11A:
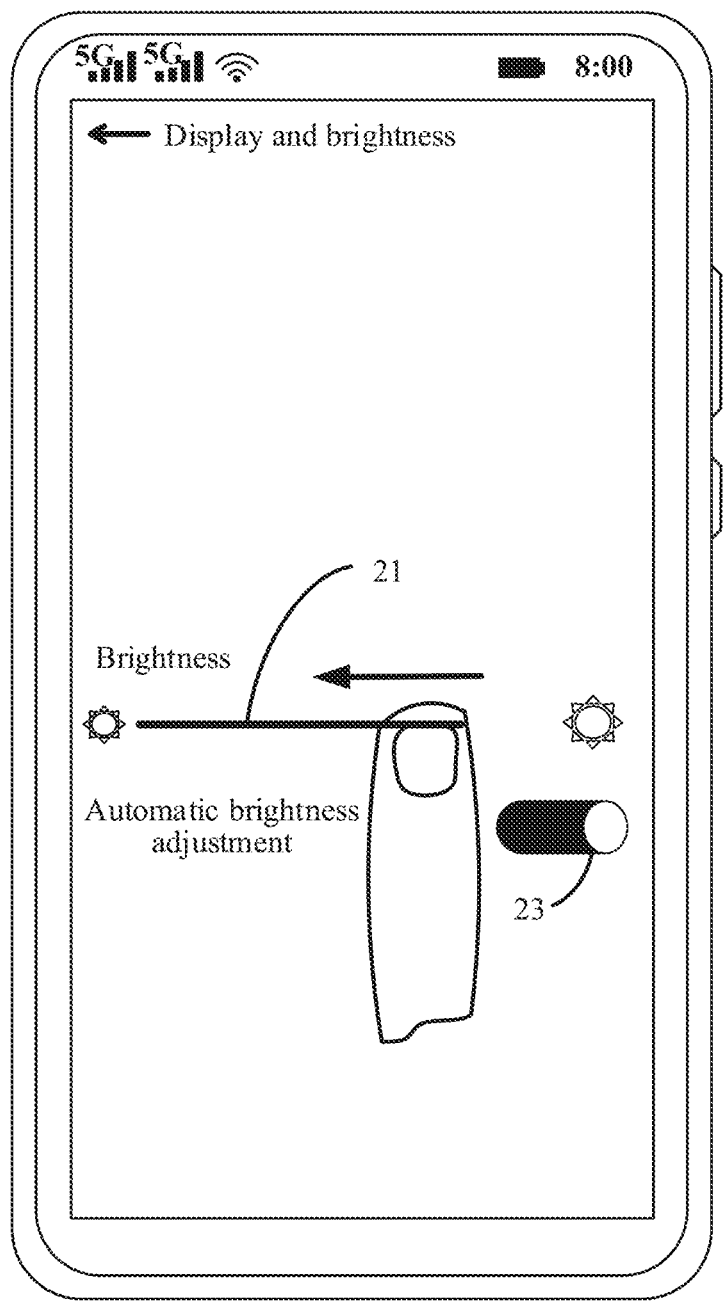
FIG. 11A is a schematic diagram in which a user adjusts a brightness bar in a setting interface according to an embodiment of this application.
Figure 11B:
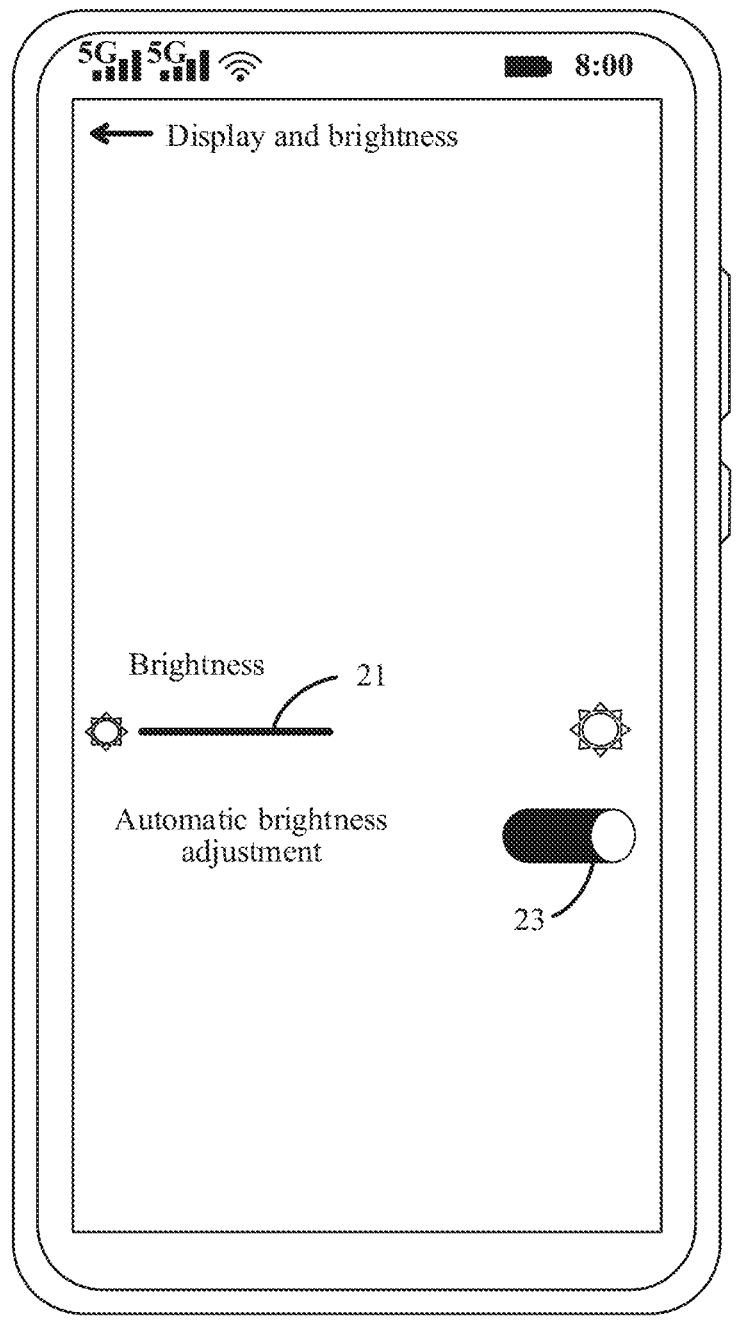
FIG. 11B is a schematic diagram of a manually adjusted brightness bar of a setting interface according to an embodiment of this application.

For example, referring to FIG. 11A, when the user slides a brightness bar 21 in a setting interface to the left, an increased value of the display screen brightness starts to be recorded. Referring to FIG. 11B, when the user stops sliding the brightness bar 21 in the setting interface, the reduced value of the display screen brightness is determined.

In an embodiment of this application, the adjusting the set display screen brightness in the third brightness range in response to an operation of manually adjusting a brightness bar by the user further includes: recording, by using the program updateSaveOffsetTime, a moment at which adjustment of the set display screen brightness in the third brightness range is completed.

S4022. Drive the display screen to perform display based on adjusted display screen brightness in the third brightness range.

In an embodiment of this application, the driving the display screen to perform display based on adjusted display screen brightness in the third brightness range includes: in the framework layer, determining display brightness corresponding to the adjusted display screen brightness in the third brightness range based on a mapping relationship between a brightness value in the third brightness range and display brightness of the display screen, and transferring the adjusted display screen brightness in the third brightness range and the corresponding display brightness to the hardware abstraction layer. In the hardware abstraction layer, the light service (LightsService) sets the adjusted display screen brightness in the third brightness range to backlight brightness of the display screen in the kernel layer. In the kernel layer, the display driving circuit drives the display screen to perform display based on the set backlight brightness, so that actual display brightness of the display screen reaches the display brightness corresponding to the adjusted display screen brightness in the third brightness range.

In another embodiment of this application, the adjusting the display screen brightness in response to a brightness setting instruction generated by manually adjusting brightness by a user further includes: setting brightness adjustment animation of the display screen based on adjusted display screen brightness, and displaying the brightness adjustment animation when the display screen is driven to perform display based on the adjusted display screen brightness in the third brightness range.

In the another embodiment of this application, the setting brightness adjustment animation of the display screen based on adjusted display screen brightness includes: setting a brightness change process of gradually changing from the set display screen brightness to the adjusted display screen brightness of the display screen, and drawing a brightness bar to indicate the adjusted display screen brightness.

In the another embodiment of this application, the setting a brightness change process of gradually changing from the set display screen brightness to the adjusted display screen brightness of the display screen includes: setting a plurality of brightness values between the set display screen brightness and the adjusted display screen brightness. The drawing a brightness bar to indicate the adjusted display screen brightness includes: drawing the brightness bar of which a ratio of an actual length to a threshold length is equal to a ratio of the adjusted display screen brightness to maximum brightness.

In the another embodiment of this application, when the display screen is driven to perform display based on the adjusted display screen brightness in the third brightness range, the display screen brightness is gradually changed from the set display screen brightness to the adjusted display screen brightness based on the plurality of brightness values set between the set display screen brightness and the adjusted display screen brightness. In addition, the brightness bars in the setting interface and the status bar interface are gradually changed to the brightness bar that is currently drawn.

S403. Determine, when a display screen is on again after the display screen is off, whether a mechanism of clearing the display screen brightness manually adjusted by the user is triggered.

In an embodiment of this application, the determining, when a display screen is on again after the display screen is off, whether a mechanism of clearing the display screen brightness manually adjusted by the user is triggered includes: when the display screen is on again after the display screen is off, determining whether at least one of the following preset conditions is met: a time interval between a current moment and a moment at which the user manually adjusts the display screen brightness last time is greater than or equal to a first preset time interval, the display screen is on and a time interval between a screen-on moment and a previous screen-off moment is greater than or equal to a second preset time interval, and ambient light brightness corresponding to a case that the user manually adjusts the display screen brightness last time is greater than or equal to preset brightness; if the at least one preset condition is met, determining that the mechanism of clearing the display screen brightness manually adjusted by the user is triggered; and if all the preset conditions are not met, determining that the mechanism of clearing the display screen brightness manually adjusted by the user is not triggered.

In an embodiment of this application, the first preset time interval is less than the second preset time interval. Optionally, the first preset time interval is four hours, the second preset time interval is eight hours, and the preset brightness is 45 lux.

When the display screen is on again after the display screen is off, if the time interval between the current moment and the moment at which the user manually adjusts the display screen brightness last time is greater than or equal to the first preset time interval, it indicates that the time interval between the current moment and the moment at which the user manually adjusts the display screen brightness last time is relatively long, and the display screen brightness manually adjusted by the user may be ignored. Therefore, the mechanism of clearing the display screen brightness manually adjusted by the user is triggered. If the time interval between the current moment and the moment at which the user manually adjusts the display screen brightness last time is less than the first preset time interval, it indicates that the time interval between the current moment and the moment at which the user manually adjusts the display screen brightness last time is relatively short, and the display screen brightness manually adjusted by the user is still used. Therefore, the mechanism of clearing the display screen brightness manually adjusted by the user is not triggered.

When the display screen is on again after the display screen is off, if the display screen is on and the time interval between the screen-on moment and the previous screen-off moment is greater than or equal to the second preset time interval, it indicates that the time interval between the screen-on moment and the previous screen-off moment is relatively long, and the display screen brightness manually adjusted by the user may be ignored. Therefore, the mechanism of clearing the display screen brightness manually adjusted by the user is triggered. If the display screen is on and the time interval between the screen-on moment and the previous screen-off moment is less than the second preset time interval, it indicates that the time interval between the screen-on moment and the previous screen-off moment is relatively short, and the display screen brightness manually adjusted by the user is still used. Therefore, the mechanism of clearing the display screen brightness manually adjusted by the user is not triggered.

When the display screen is on again after the display screen is off, if the ambient light brightness corresponding to the case that the user manually adjusts the display screen brightness last time is greater than or equal to the preset brightness, it indicates that the user may only be used to manually adjusting the display screen brightness when the ambient light brightness is relatively high. Therefore, the mechanism of clearing the display screen brightness manually adjusted by the user is triggered after the display screen is on again. If the ambient light brightness corresponding to the case that the user manually adjusts the display screen brightness is less than the preset brightness, it indicates that the user is used to manually adjusting the display screen brightness under any ambient light brightness. Therefore, the mechanism of clearing the display screen brightness manually adjusted by the user is not triggered after the display screen is on again.

In an embodiment of this application, the moment at which the user manually adjusts the display screen brightness last time is a moment that is recorded by using a program updateSaveOffsetTime and at which adjustment of the display screen brightness in the third brightness range is completed. Each screen-on moment of the display screen is recorded by a program updatebrightScreenTime( ) and each screen-off moment of the display screen is recorded by a program updateoffScreenTime( ).

S404. If the mechanism of clearing the display screen brightness manually adjusted by the user is triggered, set the display screen brightness again in response to the automatic brightness setting instruction.

In an embodiment of this application, if the mechanism of clearing the display screen brightness manually adjusted by the user is triggered, the display screen brightness manually adjusted by the user last time is ignored, and the default display screen brightness is set again in response to the automatic brightness setting instruction.

S405. Determine, in response to an operation of manually adjusting the display screen brightness again by the user, whether the operation of manually adjusting the display screen brightness again by the user is the same as a previous operation of manually adjusting the display screen brightness.

In an embodiment of this application, the determining, in response to an operation instruction of manually adjusting the display screen brightness again by the user, whether the operation of manually adjusting the display screen brightness again by the user is the same as a previous operation of manually adjusting the display screen brightness includes: when a touch display screen detects an operation of manually adjusting a brightness bar again by the user, determining whether the operation of manually adjusting the brightness bar again by the user is the same as a previous operation of manually adjusting the brightness bar; if it is determined that the operation of manually adjusting the brightness bar again by the user is the same as the previous operation of manually adjusting the brightness bar, for example, if both the operation of manually adjusting the brightness bar again by the user and the previous operation of manually adjusting the brightness bar are sliding the brightness bar to the right, determining that the operation of manually adjusting the display screen brightness again by the user is the same as the previous operation of manually adjusting the display screen brightness; and if it is determined that the operation of manually adjusting the brightness bar again by the user is different from the previous operation of manually adjusting the brightness bar, for example, if the operation of manually adjusting the brightness bar again by the user is sliding the brightness bar to the left and the previous operation of manually adjusting the brightness bar is sliding the brightness bar to the right, determining that the operation of manually adjusting the display screen brightness again by the user is different from the previous operation of manually adjusting the display screen brightness.

S406. If the operation of manually adjusting the display screen brightness again by the user is the same as the previous operation of manually adjusting the display screen brightness, adjusting, in response to a brightness setting instruction generated by manually adjusting the display screen brightness again by the user, the display screen brightness set again.

In an embodiment of this application, if the operation of manually adjusting the display screen brightness again by the user is the same as the previous operation of manually adjusting the display screen brightness, it indicates that habits that the user manually and successively adjusts the display screen brightness twice are the same, and it is determined that the user has a requirement of manually adjusting the display screen brightness again. Therefore, the display screen brightness is adjusted again in response to the brightness setting instruction generated by manually adjusting the display screen brightness again by the user, that is, the display screen brightness set again is adjusted.

S407. If the operation of manually adjusting the display screen brightness again by the user is different from the previous operation of manually adjusting the display screen brightness, keep the display screen brightness set again unchanged.

In an embodiment of this application, if the operation of manually adjusting the display screen brightness again by the user is different from the previous operation of manually adjusting the display screen brightness, it indicates that habits that the user manually and successively adjusts the display screen brightness twice are different, and it is determined that the user has no requirement of manually adjusting the display screen brightness again and the operation of manually adjusting the display screen brightness again by the user is a misoperation. Therefore, the display screen brightness that is automatically set again is kept unchanged.

S408. If the mechanism of clearing the display screen brightness manually adjusted by the user is not triggered, keep the display screen brightness adjusted last time unchanged.

In an embodiment of this application, if the mechanism of clearing the display screen brightness manually adjusted by the user is not triggered, the display screen brightness manually adjusted by the user last time is still used. Therefore, the display screen brightness manually adjusted last time is kept unchanged.

Figure 12:
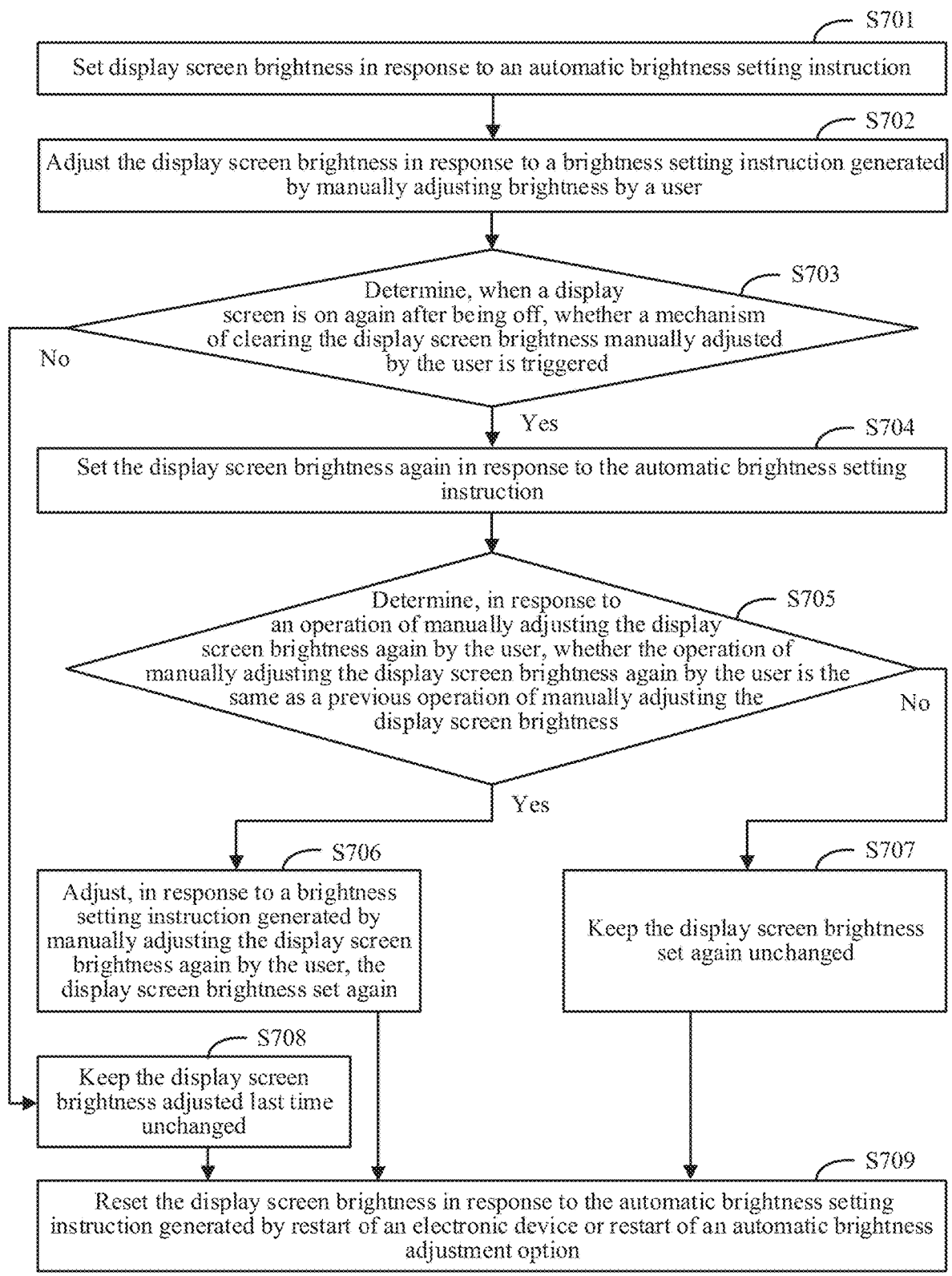
FIG. 12 is a flowchart of a method for adjusting display screen brightness according to another embodiment of this application.

FIG. 12 is a flowchart of a method for adjusting display screen brightness according to another embodiment of this application. The method is applicable to an electronic device, and the method for adjusting display screen brightness includes the following steps.

S701. Set display screen brightness in response to an automatic brightness setting instruction.

S702. Adjust the display screen brightness in response to a brightness setting instruction generated by manually adjusting brightness by a user.

S703. Determine, when a display screen is on again after the display screen is off, whether a mechanism of clearing the display screen brightness manually adjusted by the user is triggered.

S704. If the mechanism of clearing the display screen brightness manually adjusted by the user is triggered, set the display screen brightness again in response to the automatic brightness setting instruction.

S705. Determine, in response to an operation of manually adjusting the display screen brightness again by the user, whether the operation of manually adjusting the display screen brightness again by the user is the same as a previous operation of manually adjusting the display screen brightness.

S706. If the operation of manually adjusting the display screen brightness again by the user is the same as the previous operation of manually adjusting the display screen brightness, adjust, in response to a brightness setting instruction generated by manually adjusting the display screen brightness again by the user, the display screen brightness set again.

S707. If the operation of manually adjusting the display screen brightness again by the user is different from the previous operation of manually adjusting the display screen brightness, keep the display screen brightness set again unchanged.

S708. If the mechanism of clearing the display screen brightness manually adjusted by the user is not triggered, keep the display screen brightness adjusted last time unchanged.

S709. Reset the display screen brightness in response to the automatic brightness setting instruction generated by restart of an electronic device or restart of an automatic brightness adjustment option.

In an embodiment of this application, after the electronic device restarts, the display screen brightness manually adjusted by the user last time is ignored, the automatic brightness setting instruction is generated, the display screen brightness is automatically reset, and then S702 is returned.

In an embodiment of this application, as shown in FIG. 11A, the electronic device sets an automatic brightness adjustment option 23 in a setting interface. After the automatic brightness adjustment option 23 is off and then is on again, the display screen brightness manually adjusted by the user last time is ignored, the automatic brightness setting instruction is generated, and the display screen brightness is automatically reset.

Figure 13:
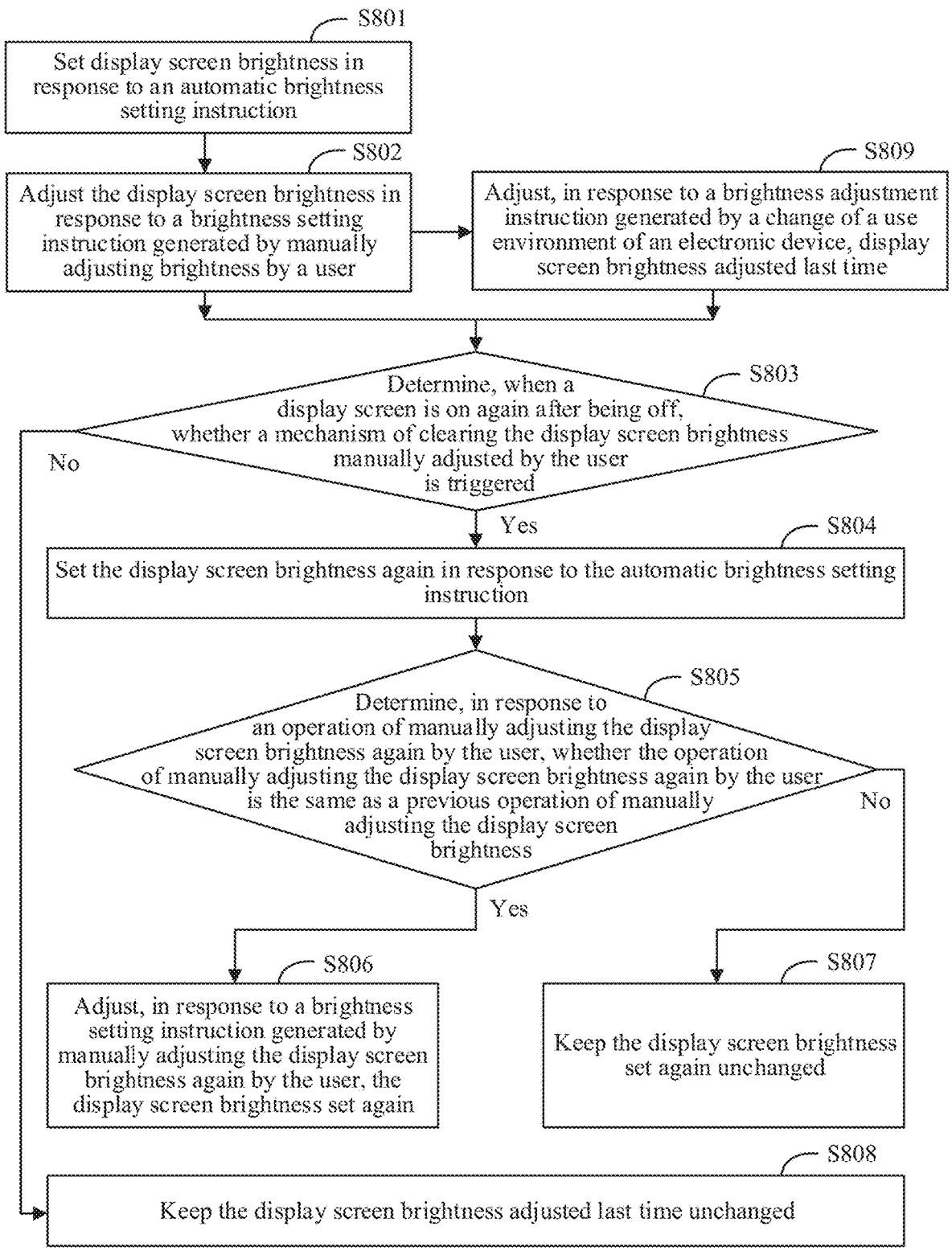
FIG. 13 is a flowchart of a method for adjusting display screen brightness according to another embodiment of this application.

FIG. 13 is a flowchart of a method for adjusting display screen brightness according to another embodiment of this application. The method is applicable to an electronic device, and the method for adjusting display screen brightness includes the following steps.

S801. Set display screen brightness in response to an automatic brightness setting instruction.

S802. Adjust the display screen brightness in response to a brightness setting instruction generated by manually adjusting brightness by a user.

S803. Determine, when a display screen is on again after the display screen is off, whether a mechanism of clearing the display screen brightness manually adjusted by the user is triggered.

S804. If the mechanism of clearing the display screen brightness manually adjusted by the user is triggered, set the display screen brightness again in response to the automatic brightness setting instruction.

S805. Determine, in response to an operation of manually adjusting the display screen brightness again by the user, whether the operation of manually adjusting the display screen brightness again by the user is the same as a previous operation of manually adjusting the display screen brightness.

S806. If the operation of manually adjusting the display screen brightness again by the user is the same as the previous operation of manually adjusting the display screen brightness, adjust, in response to a brightness setting instruction generated by manually adjusting the display screen brightness again by the user, the display screen brightness set again.

S807. If the operation of manually adjusting the display screen brightness again by the user is different from the previous operation of manually adjusting the display screen brightness, keep the display screen brightness set again unchanged.

S808. If the mechanism of clearing the display screen brightness manually adjusted by the user is not triggered, keep the display screen brightness adjusted last time unchanged.

S809. Adjust, in response to a brightness adjustment instruction generated by a change of a use environment of an electronic device, display screen brightness adjusted last time.

In an embodiment of this application, the adjusting, in response to a brightness adjustment instruction generated by a change of a use environment of an electronic device, display screen brightness adjusted last time includes: sensing ambient light brightness of an environment of the electronic device by using an ambient light sensor; when the ambient light brightness sensed by using the ambient light sensor changes, determining that the use environment of the electronic device changes, and generating the brightness adjustment instruction; and adjusting, in response to the brightness adjustment instruction, the display screen brightness manually adjusted by the user last time.

Specifically, if the ambient light brightness sensed by the ambient light sensor increases, the display screen brightness adjusted last time is increased, and if the ambient light brightness sensed by the ambient light sensor decreases, the display screen brightness adjusted last time is reduced.

In an embodiment of this application, that if the ambient light brightness sensed by the ambient light sensor increases, the display screen brightness adjusted last time is increased includes: determining default display screen brightness corresponding to current ambient light brightness, calculating an increased ratio of the default display screen brightness corresponding to the current ambient light brightness compared to default display screen brightness automatically set based on previous ambient light brightness, and increasing, based on the increased ratio, the display screen brightness adjusted last time. The increased ratio=(the default display screen brightness corresponding to the current ambient light brightness−the default display screen brightness automatically set based on the previous ambient light brightness)/the default display screen brightness automatically set based on the previous ambient light brightness.

For example, if the default display screen brightness corresponding to the current ambient light brightness is 150 and the default display screen brightness automatically set based on the previous ambient light brightness is 120, the increased ratio=(the default display screen brightness corresponding to the current ambient light brightness−the default display screen brightness automatically set based on the previous ambient light brightness)/the default display screen brightness automatically set based on the previous ambient light brightness=25%. If the display screen brightness adjusted last time is 140, the display screen brightness adjusted last time is increased to 175.

In an embodiment of this application, that if the ambient light brightness sensed by the ambient light sensor decreases, the display screen brightness adjusted last time is reduced includes: determining default display screen brightness corresponding to current ambient light brightness, calculating a reduced ratio of the default display screen brightness corresponding to the current ambient light brightness compared to default display screen brightness automatically set based on previous ambient light brightness, and reducing, based on the reduced ratio, the display screen brightness adjusted last time. The reduced ratio=(the default display screen brightness automatically set based on the previous ambient light brightness−the default display screen brightness corresponding to the current ambient light brightness)/the default display screen brightness automatically set based on the previous ambient light brightness.

For example, if the default display screen brightness corresponding to the current ambient light brightness is 150 and the default display screen brightness automatically set based on the previous ambient light brightness is 180, the increased ratio=(the default display screen brightness corresponding to the current ambient light brightness−the default display screen brightness automatically set based on the previous ambient light brightness)/the default display screen brightness automatically set based on the previous ambient light brightness=16.7%. If the display screen brightness adjusted last time is 200, the display screen brightness adjusted last time is reduced to 166.7.

In an embodiment of this application, after S809, processes of S803 to S808 are performed, that is, brightness adjustment logic that the mechanism of clearing the display screen brightness manually adjusted by the user is triggered or not triggered is performed.

Figure 14:
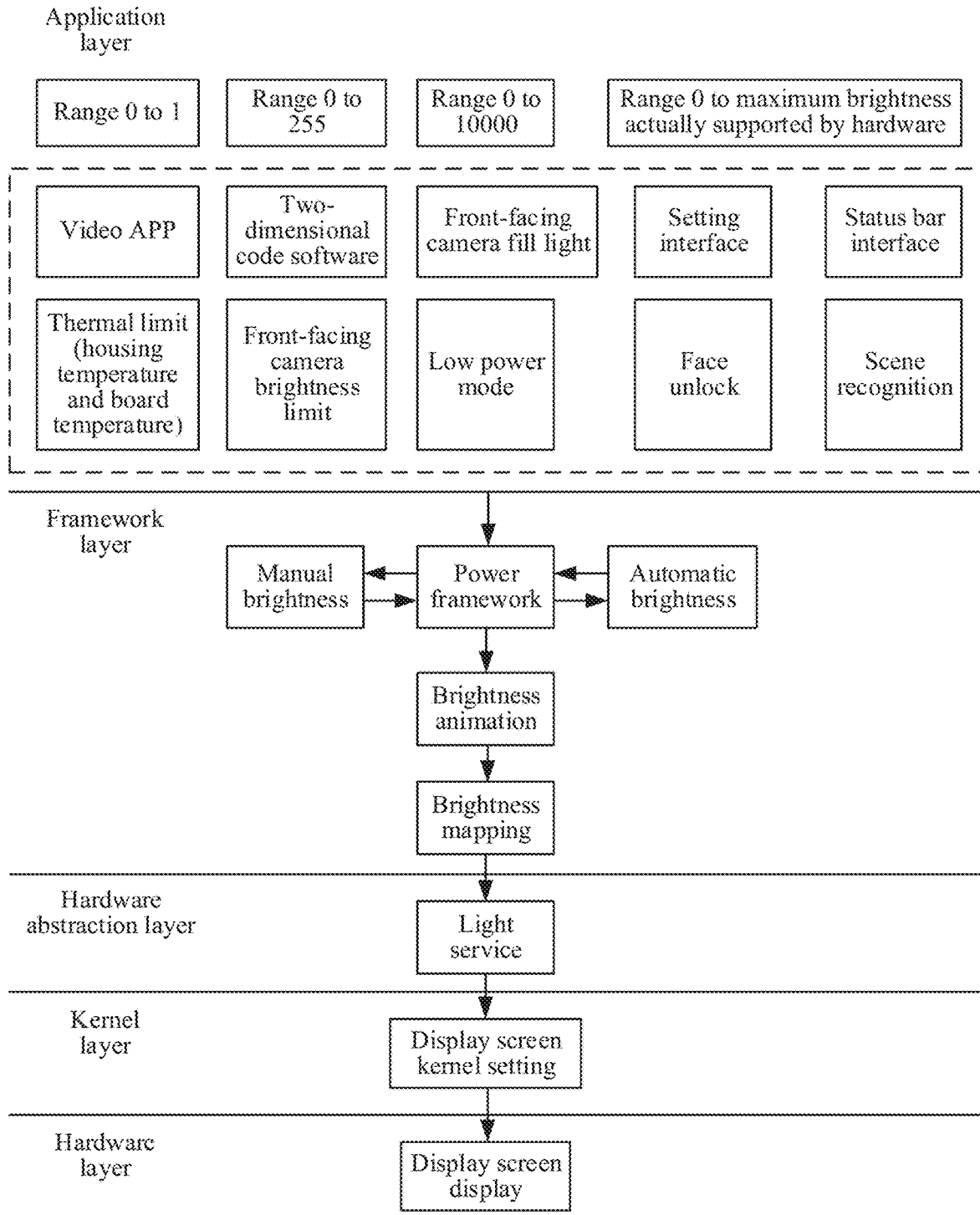
FIG. 14 is an architectural diagram of transferring display screen brightness according to an embodiment of this application.

FIG. 14 is an architectural diagram of transferring display screen brightness according to an embodiment of this application. A brightness range of the electronic device includes a first brightness range 0 to 1, a second brightness range 0 to 255, a third brightness range 0 to 10000, and a fourth brightness range 0 to maximum brightness actually supported by hardware. All the first brightness range, the second brightness range, and the third brightness range are level ranges of a backlight brightness level of a display screen, and the fourth brightness range is display brightness range of the display screen, with a unit being nit. The brightness range is not limited to the foregoing description, and another range may be further set.

In the application layer, an application that may adjust display screen brightness includes a video application, two-dimensional code software, a camera application, system setting, and status bar setting. The video application, the two-dimensional code software, and the camera application perform display screen brightness setting and adjustment based on the first brightness range 0 to 1, and the system setting and the status bar setting perform display screen brightness setting and adjustment based on the third brightness range 0 to 10000.

In the framework layer, automatic brightness setting and manual brightness setting are performed by using a pass framework. The automatic brightness setting is to perform automatic setting on display screen brightness based on a preset use scenario of the electronic device or ambient light brightness of an environment of the electronic device. The manual brightness setting is to perform manual setting on the display screen brightness by operating a brightness bar in the system setting or the status bar setting by the user. Optionally, the preset use scenario of the electronic device includes, but not limited to, thermal limit, front-facing camera brightness limit, a low power mode, face unlock, and scene recognition. In the foregoing preset use scenarios, the display screen brightness is set and adjusted based on a brightness value in the second brightness range.

In the framework layer, after the display screen brightness is set, brightness animation is set. The brightness animation includes a plurality of brightness values required for gradually changing from brightness 0 or display screen brightness set last time to display screen brightness set currently, and a length change of the brightness bar.

In the framework layer, display screen brightness in the first brightness range and the second brightness range is mapped, to obtain display screen brightness in the third brightness range, a mapping relationship between the display screen brightness in the third brightness range and display brightness in the fourth brightness range is further established, and the mapped display screen brightness in the third brightness range and corresponding display brightness in the fourth brightness range are transferred to the hardware abstraction layer.

In the hardware abstraction layer, the light service LightsService sets the display screen brightness in the third brightness range to backlight brightness of the display screen in the kernel layer.

In the kernel layer, the display driving circuit drives the display screen in the hardware layer to perform display based on the set backlight brightness of the display screen.

In the hardware layer, backlight brightness when the display screen displays a user interface is the set backlight brightness, and light brightness (with a unit being nit) displayed in the display screen is display brightness corresponding to the set backlight brightness.

Figure 15:
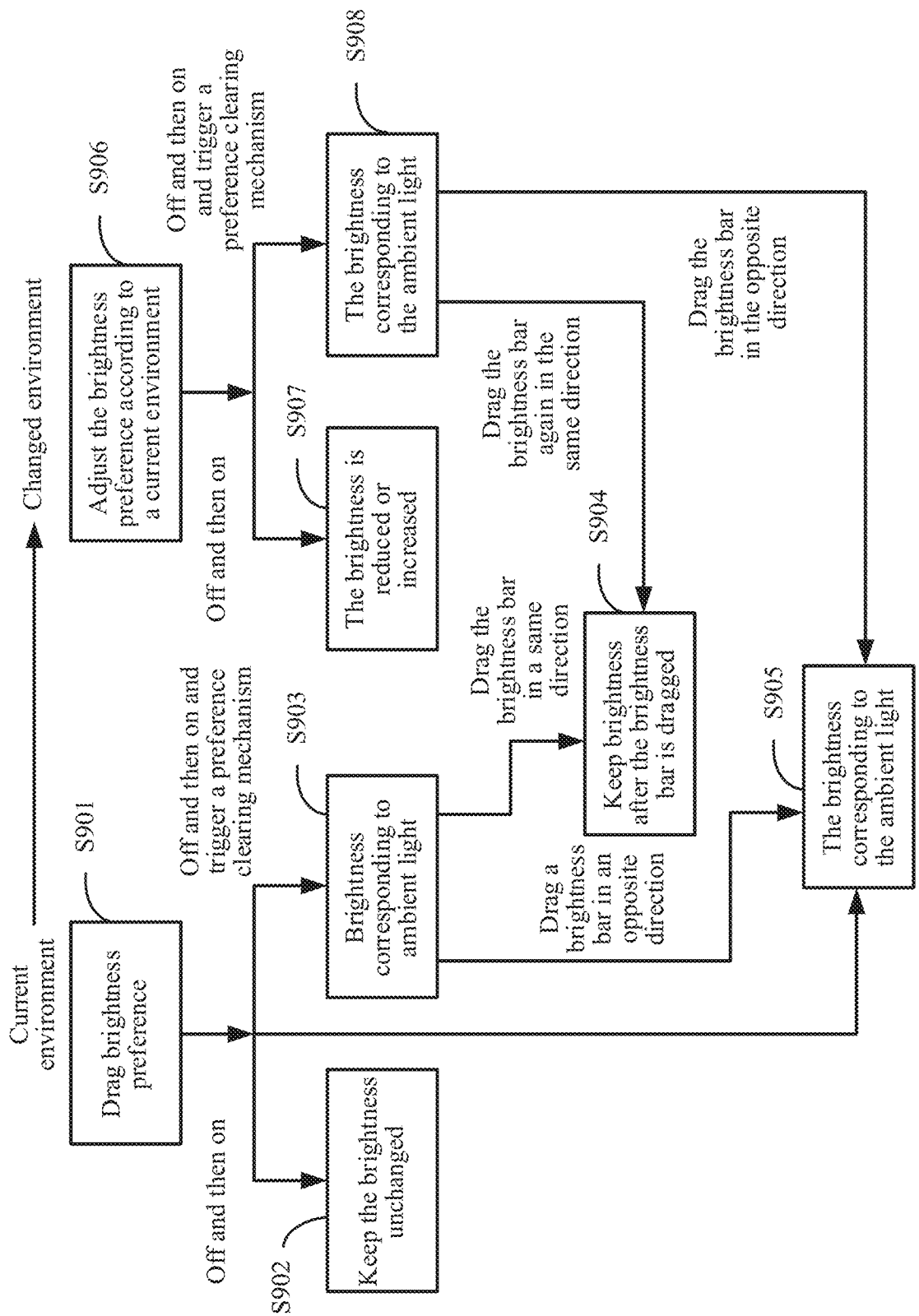
FIG. 15 is a flowchart of a method for adjusting display screen brightness according to another embodiment of this application.

FIG. 15 is a flowchart of a method for adjusting display screen brightness according to another embodiment of this application.

S901. Set, based on current automatically set display screen brightness, a display screen according to favorite brightness generated by dragging a brightness bar by a user.

S902. When the display screen is on after being off, if a mechanism of clearing brightness preference is not triggered, the display screen keeps the favorite brightness unchanged.

S903. When the display screen is on after being off, if the mechanism of clearing the brightness preference is triggered, reset the display screen brightness based on ambient light brightness.

S904. If the user drags the brightness bar again and a direction of dragging the brightness bar is the same as that of previous dragging, set the display screen according to favorite brightness generated by dragging the brightness bar again by the user.

S905. If the user drags the brightness bar again and a direction of dragging the brightness bar is different from that of previous dragging, the display screen keeps the display screen brightness reset based on the ambient light brightness unchanged.

S906. When a use environment of an electronic device changes, perform adjustment based on the current set favorite brightness of the display screen.

S907. When the display screen is on after being off, if the mechanism of clearing brightness preference is not triggered, the display screen keeps adjusted favorite brightness unchanged, where the adjusted favorite brightness is reduced or increased compared with the first set favorite brightness.

S908. When the display screen is on after being off, if the mechanism of clearing the brightness preference is triggered, reset the display screen brightness based on the ambient light brightness.

After S908, processes of S904 and S905 are performed.

Figure 16:
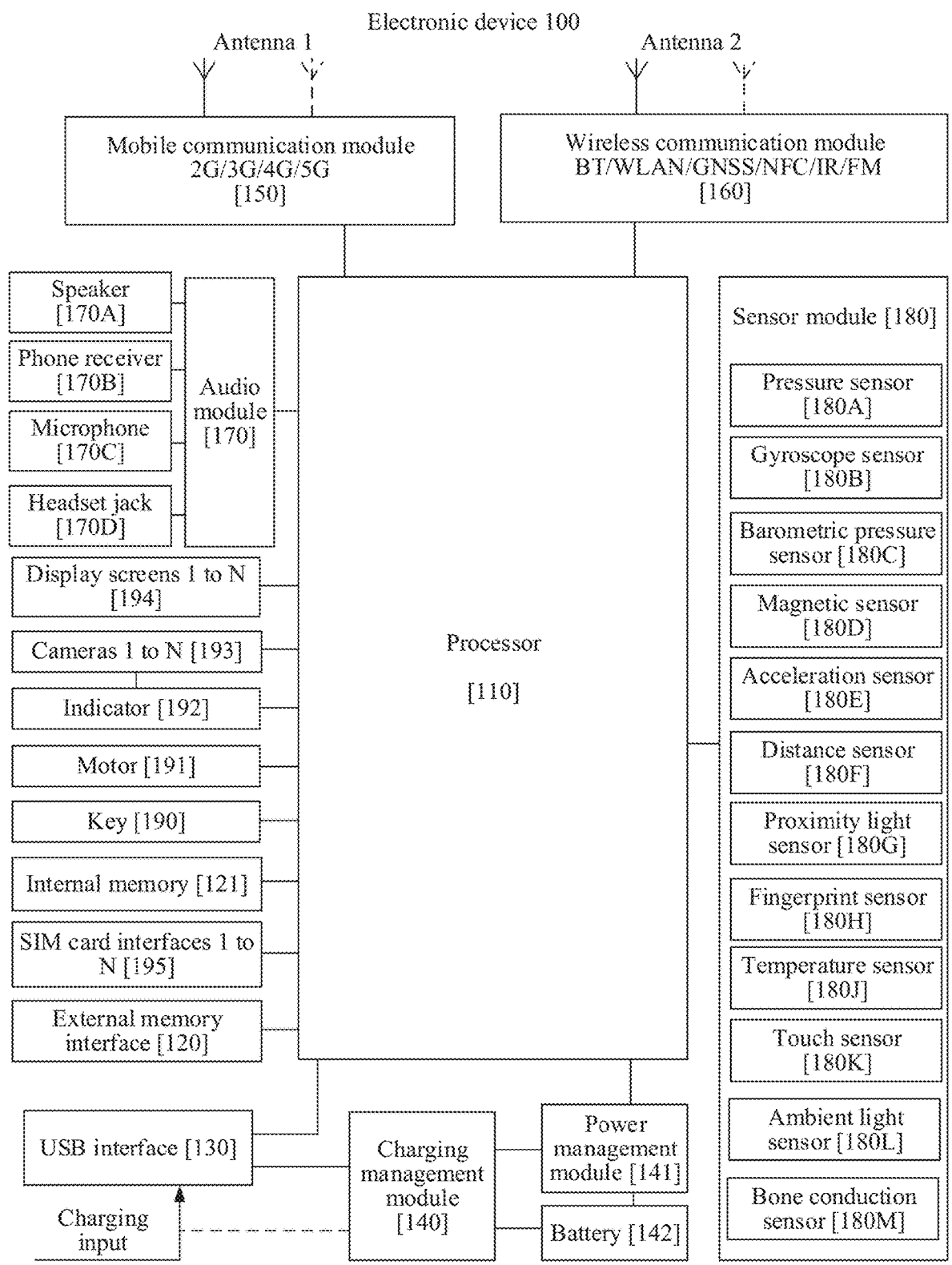
FIG. 16 is a diagram of a hardware architecture of an electronic device according to an embodiment of this application

Referring to FIG. 16, the electronic device 100 may be a mobile phone, a tablet computer, a desktop computer, a laptop computer, a handheld computer, a notebook computer, an ultra-mobile personal computer (UMPC), a netbook, a cellular phone, a personal digital assistant (PDA), an augmented reality (AR) device, a virtual reality (VR) device, an artificial intelligence (AI) device, a wearable device, a vehicle-mounted device, a smart home device, and/or a smart city device. A specific type of the electronic device 100 is not specifically limited in this embodiment of this application.

The electronic device 100 may include a processor 110, an external memory interface 120, an internal memory 121, a universal serial bus (USB) interface 130, a charging management module 140, a power management unit 141, a battery 142, an antenna 1, an antenna 2, a mobile communication module 150, a wireless communication module 160, an audio module 170, a speaker 170A, a phone receiver 170B, a microphone 170C, a headset jack 170D, a sensor module 180, a key 190, a motor 191, an indicator 192, a camera 193, a display screen 194, a subscriber identification module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, and a touch sensor 180K, an ambient light sensor 180L, a bone conduction sensor 180M, and the like.

It may be understood that an example structure in this embodiment of the present disclosure does not constitute a specific limitation on the electronic device 100. In some other embodiments of this application, the electronic device 100 may include more or fewer components than those shown in the figure, or some components may be combined, or some components may be divided, or different component arrangements may be used. The components in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be separate components, or may be integrated into one or more processors.

The controller may generate an operation control signal based on an instruction operation code and a timing signal, and implement control on instruction fetching and instruction execution.

A memory may be further configured in the processor 110, to store an instruction and data. In some embodiments, the memory in the processor 110 is a cache. The memory may store an instruction or data that has just been used or cyclically used by the processor 110. If the processor 110 needs to use the instruction or the data again, the processor 110 may directly invoke the instruction or the data from the memory, to avoid repeated access and reduce a waiting time of the processor 110, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a bidirectional synchronous serial bus, including a serial data line (SDA) and a serial clock line (SCL). In some embodiments, the processor 110 may include a plurality of groups of I2C buses. The processor 110 may be coupled to the touch sensor 180K, a charger, a flash light, the camera 193, and the like by using different I2C bus interfaces. For example, the processor 110 may be coupled to the touch sensor 180K by using the I2C interface, so that the processor 110 communicates with the touch sensor 180K by using the I2C bus interface, to implement a touch function of the electronic device 100.

The I2S interface may be used for audio communication.

The PCM interface may also be used for audio communication, and sampling, quantization, and encoding of an analog signal.

The UART interface is a universal serial data bus, and is used for asynchronous communication. The bus may be a two-way communication bus. The bus converts to-be-transmitted data between serial communication and parallel communication.

The MIPI interface may be configured to connect the processor 110 to a peripheral device such as the display screen 194 or the camera 193. The MIPI interface include a camera serial interface (CSI), a display serial interface (DSI), and the like. In some embodiments, the processor 110 communicates with the display screen 194 by using a DSI interface, to implement a display function of the electronic device 100.

The GPIO interface may be configured by using software. The GPIO interface may be configured to transmit a control signal, or may be configured to transmit a data signal.

The USB interface 130 is an interface that conforms to a USB standard specification, and may be specifically a mini USB interface, a micro USB interface, a USB Type C interface, or the like.

It may be understood that an interface connection relationship between the modules illustrated in this embodiment of the present disclosure is merely an example for description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

The electronic device 100 implements a display function by using the GPU, the display screen 194, the application processor, and the like. The GPU is a microprocessor for image processing, and is connected to the display screen 194 and the application processor. The GPU is configured to perform mathematical and geometric computation, and render an image. The processor 110 may include one or more GPUs, and execute program instructions to generate or change display information.

The display screen 194 is configured to display an image, a video, and the like. The display screen 194 includes a display panel. The display panel may be a liquid crystal display (LCD), an organic light-emitting diode (OLED), an active-matrix organic light emitting diode (AMOLED), a flexible light-emitting diode (FLED), a Miniled, a Microled, a Micro-OLED, a quantum dot light emitting diode (QLED), or the like. In some embodiments, the electronic device 100 may include one or N display screens 194, and N is a positive integer greater than 1.

The digital signal processor is configured to process a digital signal, and in addition to a digital image signal, may further process another digital signal. For example, when the electronic device 100 performs frequency selection, the digital signal processor is configured to perform Fourier transform and the like on frequency energy.

The internal memory 121 may include one or more random access memories (RAMs) and one or more non-volatile memories (NVMs).

The random access memories may include a static-random access memory (SRAM), a dynamic random access memory (DRAM), a synchronous dynamic random access memory (SDRAM), double data rate synchronous dynamic random access memory (DDR SDRAM, for example, a fifth generation DDR SDRAM is generally referred to as DDR5 SDRAM), and the like.

The non-volatile memories may include a magnetic disk storage device and a flash memory.

The flash memory may be classified, based on an operating principle, into an NOR FLASH, an NAND FLASH, a 3D NAND FLASH, and the like: may be classified, based on a quantity of electric potential levels of a cell, into a single-level cell (SLC), a multi-level cell (MLC), a triple-level cell (TLC), a quad-level cell (QLC), and the like: or may be classified, based on a storage specification, into a universal flash storage (UFS), an embedded multimedia card (eMMC), and the like.

The random access memory may be directly read and written by the processor 110, may be configured to store executable programs (for example, machine instructions) of an operating system or other running programs, or may be configured to store data of users and applications.

The non-volatile memory may also store the executable programs, the data of the users and the applications, and the like, and may be loaded into the random access memory in advance for the processor 110 to perform direct reading and writing.

The external memory interface 120 may be configured to connect to an external non-volatile memory, to expand a storage capability of the electronic device 100. The external non-volatile memory communicates with the processor 110 by using the external memory interface 120, to implement a data storage function, for example storing a file such as a music or a video in the external non-volatile memory.

The internal memory 121 or the external memory interface 120 is configured to store one or more computer programs. One or more computer programs are configured to be executed by the processor 110. The one or more computer programs include a plurality of instructions. When the plurality of instructions are executed by the processor 110, the method for adjusting display screen brightness that is performed on the electronic device 100 in the foregoing embodiments may be implemented, so as to implement a handwriting input display function of the electronic device 100.

The pressure sensor 180A is configured to sense a pressure signal, and may convert the pressure signal into an electrical signal. In some embodiments, the pressure sensor 180A may be disposed in the display screen 194. There are a plurality of types of pressure sensors 180A, for example, a resistive pressure sensor, an inductive pressure sensor, and a capacitive pressure sensor. The capacitive pressure sensor may include at least two parallel plates having conductive materials. When a force is applied to the pressure sensor 180A, the capacitance between electrodes changes. The electronic device 100 determines strength of pressure based on a change of the capacitance. When a touch operation is performed on the display screen 194, the electronic device 100 detects strength of the touch operation by using the pressure sensor 180A. The electronic device 100 may further calculate a position of the touch based on a detection signal of the pressure sensor 180A. In some embodiments, touch operations that are performed on a same touch position but have different touch operation strength may correspond to different operation instructions. For example, when a touch operation whose touch operation strength is less than a first pressure threshold is performed on an SMS message application icon, an instruction of checking an SMS message is executed. When a touch operation whose touch operation strength is greater than or equal to the first pressure threshold is performed on the SMS message application icon, an instruction of creating a new SMS message is executed.

The touch sensor 180K is also referred to as a "touch device". The touch sensor 180K may be disposed on the display screen 194. The touch sensor 180K and the display screen 194 form a touchscreen, which is also referred to as a "touchscreen". The touch sensor 180K is configured to detect a touch operation performed on or near the touch sensor 180K. The touch sensor may transmit the detected touch operation to the application processor, to determine a touch event type. The touch sensor 180K may provide a visual output related to the touch operation by using the display screen 194. In some other embodiments, the touch sensor 180K may be alternatively disposed on a surface of the electronic device 100, and is located on a position different from that of the display screen 194.

An embodiment further provides a computer storage medium. The computer storage medium stores computer instructions. When the computer instructions are run on an electronic device 100, the electronic device 100 is enabled to perform the foregoing related method steps to implement the method for adjusting display screen brightness in the foregoing embodiments.

An embodiment further provides a computer program product. When the computer program product runs on a computer, the computer is caused to perform the relevant steps, to implement the method for adjusting display screen brightness in the foregoing embodiments.

In addition, an embodiment of this application further provides an apparatus. The apparatus may be specifically a chip, a component, or a module. The apparatus may include a processor and a memory that are connected. The memory is configured to store computer-executable instructions. When the apparatus runs, the processor may execute the computer-executable instructions stored in the memory, to cause the chip to perform the method for adjusting display screen brightness in the foregoing method embodiments.

The electronic device, the computer storage medium, the computer program product, or the chip provided in the embodiments may be configured to perform the corresponding method provided above. Therefore, for beneficial effects that can be achieved, refer to the beneficial effects of the corresponding method provided above. Details are not described herein again.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or part of the functions described above.

In the several embodiments provided in this application, it should be understood that the disclosed apparatus and method may be implemented in other manners. For example, the described apparatus embodiment is merely an example. For example, the module or unit division is merely a logical function division and may be other division during actual implementations. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed in multiple different places. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit. The integrated unit may be implemented in the form of hardware, or may be implemented in the form of a software function unit.

When the integrated unit is implemented in the form of a software functional unit and sold or used as an independent product, the integrated unit may be stored in a readable storage medium. Based on such an understanding, the technical solutions in embodiments of this application essentially, or the part contributing to conventional technologies, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

Finally, it should be noted that the foregoing embodiments are merely intended to describe the technical solutions of this application, but are not intended to limit this application. Although this application is described in detail with reference to example embodiments, a person of ordinary skill in the art should understand that modification or equivalent replacement may be made to the technical solutions of this application without departing from the spirit and scope of the technical solutions of this application.

What is claimed is:

1. A method for adjusting display screen brightness, comprising:
    setting display screen brightness in response to an automatic brightness setting instruction;
    adjusting the display screen brightness in response to a brightness setting instruction generated by manually adjusting brightness;
    determining, when a display screen is on again after the display screen is off, whether a mechanism of clearing the display screen brightness manually adjusted is triggered;
    based on the mechanism of clearing the display screen brightness manually adjusted being triggered, setting the display screen brightness again in response to the automatic brightness setting instruction;
    determining, in response to an operation of manually adjusting the display screen brightness again, whether the operation of manually adjusting the display screen brightness again is the same as a previous operation of manually adjusting the display screen brightness; and
    based on the operation of manually adjusting the display screen brightness again being the same as the previous operation of manually adjusting the display screen brightness, adjusting, in response to a brightness setting instruction generated by manually adjusting the display screen brightness again, the display screen brightness set again;
    wherein the determining, in response to the operation instruction of manually adjusting the display screen brightness again, whether the operation of manually adjusting the display screen brightness again is the same as the previous operation of manually adjusting the display screen brightness comprises:
        when the display screen detects an operation of manually adjusting a brightness bar again, determining whether the operation of manually adjusting the brightness bar again is the same as a previous operation of manually adjusting the brightness bar;
        based on determining that the operation of manually adjusting the brightness bar again is the same as the previous operation of manually adjusting the brightness bar, determining that the operation of manually adjusting the display screen brightness again is the same as the previous operation of manually adjusting the display screen brightness; and
        based on determining that the operation of manually adjusting the brightness bar again is different from the previous operation of manually adjusting the brightness bar, determining that the operation of manually adjusting the display screen brightness again is different from the previous operation of manually adjusting the display screen brightness.

2. The method for adjusting display screen brightness according to claim 1, wherein the setting display screen brightness in response to the automatic brightness setting instruction comprises:
    determining whether a use scenario of an electronic device is a preset first use scenario or a preset second use scenario;
    based on determining that the use scenario of the electronic device is the preset first use scenario, determining a brightness value in a first brightness range as the display screen brightness;
    based on determining that the use scenario of the electronic device is the preset second use scenario, determining a brightness value in a second brightness range as the display screen brightness;
    mapping the determined display screen brightness in the first brightness range or the second brightness range to display screen brightness in a third brightness range; and
    driving the display screen to perform display based on the display screen brightness in the third brightness range.

3. The method for adjusting display screen brightness according to claim 2,
    wherein the preset first use scenario comprises: the electronic device runs a video application, the electronic device runs two-dimensional code software, or the electronic device is in a front-facing camera fill-in light state; and
    wherein the preset second use scenario comprises: the electronic device is in a thermal limit state, the electronic device is in a front-facing camera brightness limit state, the electronic device is in a low power mode, the electronic device is in a face unlock state, or the electronic device is in a scene recognition state.

4. The method for adjusting display screen brightness according to claim 2, wherein the setting display screen brightness in response to the automatic brightness setting instruction comprises:
    sensing, when the display screen is on, ambient light brightness of an environment of the electronic device by using an ambient light sensor;
    determining, in response to an automatic brightness setting instruction generated based on the ambient light brightness, a preset ambient light brightness interval within which the ambient light brightness falls;
    determining, based on a correspondence between the brightness value in the second brightness range and the preset ambient light brightness interval, display screen brightness corresponding to the preset ambient light brightness interval within which the ambient light brightness falls;
    mapping the display screen brightness in the second brightness range to the display screen brightness in the third brightness range; and
    driving the display screen to perform display based on the display screen brightness in the third brightness range.

5. The method for adjusting display screen brightness according to claim 4, wherein the sensing, when the display screen is on, the ambient light brightness of the environment of the electronic device by using the ambient light sensor comprises:
    based on the display screen being switched from a screen-off state to a screen-on state, generating a trigger instruction to trigger the ambient light sensor to sense ambient light, converting a sensed optical signal into an electrical signal, converting the electrical signal into brightness information, and generating the automatic brightness setting instruction based on the brightness information.

6. The method for adjusting display screen brightness according to claim 4, wherein the sensing, when the display screen is on, the ambient light brightness of the environment of the electronic device by using the ambient light sensor comprises:

based on the display screen being in a screen-on state, sensing, by the ambient light sensor, ambient light at a preset sampling rate, converting a sensed optical signal into an electrical signal, converting the electrical signal into brightness information, and generating the automatic brightness setting instruction based on the brightness information when the brightness information changes and lasts for a preset time.

7. The method for adjusting display screen brightness according to claim 4, wherein a mapping relationship among brightness values in the first brightness range, the second brightness range, and the third brightness range comprises: a brightness value in the first brightness range corresponds to a brightness value in the second brightness range or a sub-brightness range of the second brightness range, the sub-brightness range of the second brightness range corresponds to a sub-brightness range of the third brightness range, and a brightness value in the second brightness range corresponds to a brightness value in the third brightness range or a sub-brightness range of the third brightness range.

8. The method for adjusting display screen brightness according to claim 4, wherein the first brightness range is from 0 to 1, the second brightness range is from 0 to 255, and the third brightness range is from 0 to 10000.

9. The method for adjusting display screen brightness according to claim 4, wherein the driving the display screen to perform the display based on the display screen brightness in the third brightness range comprises:
  obtaining a maximum display brightness supported by the display screen;
  establishing a mapping relationship between a brightness value in the third brightness range and display brightness of the display screen based on the maximum display brightness;
  determining a display brightness corresponding to the display screen brightness in the third brightness range based on the mapping relationship;
  setting the display screen brightness in the third brightness range to a backlight brightness of the display screen; and
  driving, by a display driving circuit, the display screen to perform display based on the backlight brightness, so that actual display brightness of the display screen reaches the display brightness corresponding to the display screen brightness in the third brightness range.

10. The method for adjusting display screen brightness according to claim 9, wherein the adjusting the display screen brightness in response to the brightness setting instruction generated by manually adjusting brightness comprises:
  adjusting the set display screen brightness in the third brightness range in response to an operation of manually adjusting the brightness bar; and
  driving the display screen to perform display based on adjusted display screen brightness in the third brightness range.

11. The method for adjusting display screen brightness according to claim 10, wherein the adjusting the display screen brightness in response to the brightness setting instruction generated by manually adjusting brightness further comprises:
  setting a brightness adjustment animation of the display screen based on the adjusted display screen brightness, and displaying the brightness adjustment animation when the display screen is driven to perform display based on the adjusted display screen brightness in the third brightness range.

12. The method for adjusting display screen brightness according to claim 11, wherein the setting the brightness adjustment animation of the display screen based on the adjusted display screen brightness comprises:
  setting a brightness change process of gradually changing from the set display screen brightness to the adjusted display screen brightness of the display screen, and drawing the brightness bar to indicate the adjusted display screen brightness.

13. The method for adjusting display screen brightness according to claim 1, wherein the determining, when the display screen is on again after the display screen is off, whether the mechanism of clearing the display screen brightness manually adjusted is triggered comprises:
  when the display screen is on again after the display screen is off, determining whether at least one of the following preset conditions is met: a time interval between a current moment and a moment at which the user manually adjusts the display screen brightness last time is greater than or equal to a first preset time interval, the display screen is on and a time interval between a screen-on moment and a previous screen-off moment is greater than or equal to a second preset time interval, or an ambient light brightness corresponding to a case that a user manually adjusts the display screen brightness last time is greater than or equal to preset brightness;
  based on at least one preset condition being met, determining that the mechanism of clearing the display screen brightness manually adjusted is triggered; and
  based on none of the at least one preset conditions being met, determining that the mechanism of clearing the display screen brightness manually adjusted is not triggered.

14. The method for adjusting display screen brightness according to claim 1, further comprising:
  based on the mechanism of clearing the display screen brightness manually adjusted not being triggered, keeping the display screen brightness adjusted last time unchanged.

15. The method for adjusting display screen brightness according to claim 1, further comprising:
  resetting the display screen brightness in response to the automatic brightness setting instruction generated by restart of an electronic device or restart of an automatic brightness adjustment option.

16. The method for adjusting display screen brightness according to claim 1, further comprising:
  adjusting, in response to a brightness adjustment instruction generated by a change of a use environment of an electronic device, display screen brightness adjusted last time.

17. An electronic device, comprising:
  a memory configured to store program instructions; and
  a processor configured to read and execute the program instructions stored in the memory, and when the program instructions are executed by the processor, the electronic device is enabled to perform operations comprising:
    setting display screen brightness in response to an automatic brightness setting instruction;
    adjusting the display screen brightness in response to a brightness setting instruction generated by manually adjusting brightness;

determining, when a display screen is on again after the display screen is off, whether a mechanism of clearing the display screen brightness manually adjusted is triggered;

based on the mechanism of clearing the display screen brightness manually adjusted being triggered, setting the display screen brightness again in response to the automatic brightness setting instruction;

determining, in response to an operation of manually adjusting the display screen brightness again, whether the operation of manually adjusting the display screen brightness again is the same as a previous operation of manually adjusting the display screen brightness; and based on the operation of manually adjusting the display screen brightness again being the same as the previous operation of manually adjusting the display screen brightness, adjusting, in response to a brightness setting instruction generated by manually adjusting the display screen brightness again, the display screen brightness set again;

wherein the determining, in response to the operation instruction of manually adjusting the display screen brightness again, whether the operation of manually adjusting the display screen brightness again is the same as the previous operation of manually adjusting the display screen brightness comprises:

when the display screen detects an operation of manually adjusting a brightness bar again, determining whether the operation of manually adjusting the brightness bar again is the same as a previous operation of manually adjusting the brightness bar;

based on determining that the operation of manually adjusting the brightness bar again is the same as the previous operation of manually adjusting the brightness bar, determining that the operation of manually adjusting the display screen brightness again is the same as the previous operation of manually adjusting the display screen brightness; and based on determining that the operation of manually adjusting the brightness bar again is different from the previous operation of manually adjusting the brightness bar, determining that the operation of manually adjusting the display screen brightness again is different from the previous operation of manually adjusting the display screen brightness.

18. The electronic device according to claim 17, wherein the setting display screen brightness in response to the automatic brightness setting instruction comprises:

determining whether a use scenario of an electronic device is a preset first use scenario or a preset second use scenario;

based on determining that the use scenario of the electronic device is the preset first use scenario, determining a brightness value in a first brightness range as the display screen brightness;

based on determining that the use scenario of the electronic device is the preset second use scenario, determining a brightness value in a second brightness range as the display screen brightness;

mapping the determined display screen brightness in the first brightness range or the second brightness range to display screen brightness in a third brightness range; and driving the display screen to perform display based on the display screen brightness in the third brightness range.

19. A non-transitory computer-readable storage medium, storing program instructions that, when executed on an electronic device, cause the electronic device to perform operations comprising:

setting display screen brightness in response to an automatic brightness setting instruction;

adjusting the display screen brightness in response to a brightness setting instruction generated by manually adjusting brightness;

determining, when a display screen is on again after the display screen is off, whether a mechanism of clearing the display screen brightness manually adjusted is triggered;

based on the mechanism of clearing the display screen brightness manually adjusted being triggered, setting the display screen brightness again in response to the automatic brightness setting instruction;

determining, in response to an operation of manually adjusting the display screen brightness again, whether the operation of manually adjusting the display screen brightness again is the same as a previous operation of manually adjusting the display screen brightness; and based on the operation of manually adjusting the display screen brightness again being the same as the previous operation of manually adjusting the display screen brightness, adjusting, in response to a brightness setting instruction generated by manually adjusting the display screen brightness again, the display screen brightness set again;

wherein the determining, in response to the operation instruction of manually adjusting the display screen brightness again, whether the operation of manually adjusting the display screen brightness again is the same as the previous operation of manually adjusting the display screen brightness comprises:

when the display screen detects an operation of manually adjusting a brightness bar again, determining whether the operation of manually adjusting the brightness bar again is the same as a previous operation of manually adjusting the brightness bar;

based on determining that the operation of manually adjusting the brightness bar again is the same as the previous operation of manually adjusting the brightness bar, determining that the operation of manually adjusting the display screen brightness again is the same as the previous operation of manually adjusting the display screen brightness; and based on determining that the operation of manually adjusting the brightness bar again is different from the previous operation of manually adjusting the brightness bar, determining that the operation of manually adjusting the display screen brightness again is different from the previous operation of manually adjusting the display screen brightness.

20. The computer-readable storage medium according to claim 19, wherein the setting display screen brightness in response to the automatic brightness setting instruction comprises:

determining whether a use scenario of an electronic device is a preset first use scenario or a preset second use scenario;

based on determining that the use scenario of the electronic device is the preset first use scenario, determining a brightness value in a first brightness range as the display screen brightness;

based on determining that the use scenario of the electronic device is the preset second use scenario, determining a brightness value in a second brightness range as the display screen brightness;

mapping the determined display screen brightness in the first brightness range or the second brightness range to display screen brightness in a third brightness range; and driving the display screen to perform display based on the display screen brightness in the third brightness range.

\* \* \* \* \*